(12) United States Patent
Takagi

(10) Patent No.: US 6,522,338 B1
(45) Date of Patent: Feb. 18, 2003

(54) METHOD OF COLOR MATCHING BETWEEN COLOR IMAGE PROCESSING DEVICES, BY INTERPOLATION OF RELATIVELY SMALL NUMBER OF COLOR DATA SETS

(75) Inventor: Atsushi Takagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/190,848

(22) Filed: Nov. 12, 1998

(30) Foreign Application Priority Data

Nov. 12, 1997  (JP) .............................................. 9-310205

(51) Int. Cl.$^7$ ................................................ G09G 5/02
(52) U.S. Cl. ...................................... 345/600; 345/597
(58) Field of Search ................................. 345/431, 597, 345/600

(56) References Cited

U.S. PATENT DOCUMENTS

| 5,590,251 A | 12/1996 | Takagi |
| 5,809,213 A | 9/1998 | Bhattacharjya ............. 395/106 |
| 6,088,038 A | * 7/2000 | Edge et al. ................. 345/431 |

FOREIGN PATENT DOCUMENTS

EP  0 637 731 A1  2/1995

OTHER PUBLICATIONS

Ozeki, et al., "Color Hardcopy System for Color Designing", Display and Imaging, 1996, vol. 4, pp. 253–260.

* cited by examiner

Primary Examiner—Jeffery Brier
Assistant Examiner—Motilewa Good-Johnson
(74) Attorney, Agent, or Firm—Pillsbury Winthrop LLP

(57) ABSTRACT

Color matching method wherein relatively small number of input color data sets (Xn, Rn) are applied to first image processor, to obtain the corresponding output color data sets (Rn, Xn) which are interpolated to obtain relatively large number of output color data sets, which are used to obtain relatively large number of the corresponding input color data sets by inverse estimation, for obtaining first high-resolution input-output relationship Rn=$f_{image}$(Xn) or Xn=$f_{disp}$(Rn) of the first image processor, and wherein second high-resolution input-output relationship (Xn=$f_{disp}$(Rn) or Xn=$f_{copy}$(Rn) of second image processor is similarly obtained, so that a color data correlationship Rn(SG2)=f(Rn(SG1)) or Rn(SG3)=f(Rn(SG2)) for converting the relatively large number of input color data sets of the first image processor into the relatively large number of input color data sets of the second image processor is obtained according to the first and second high-resolution input-output relationships.

9 Claims, 12 Drawing Sheets

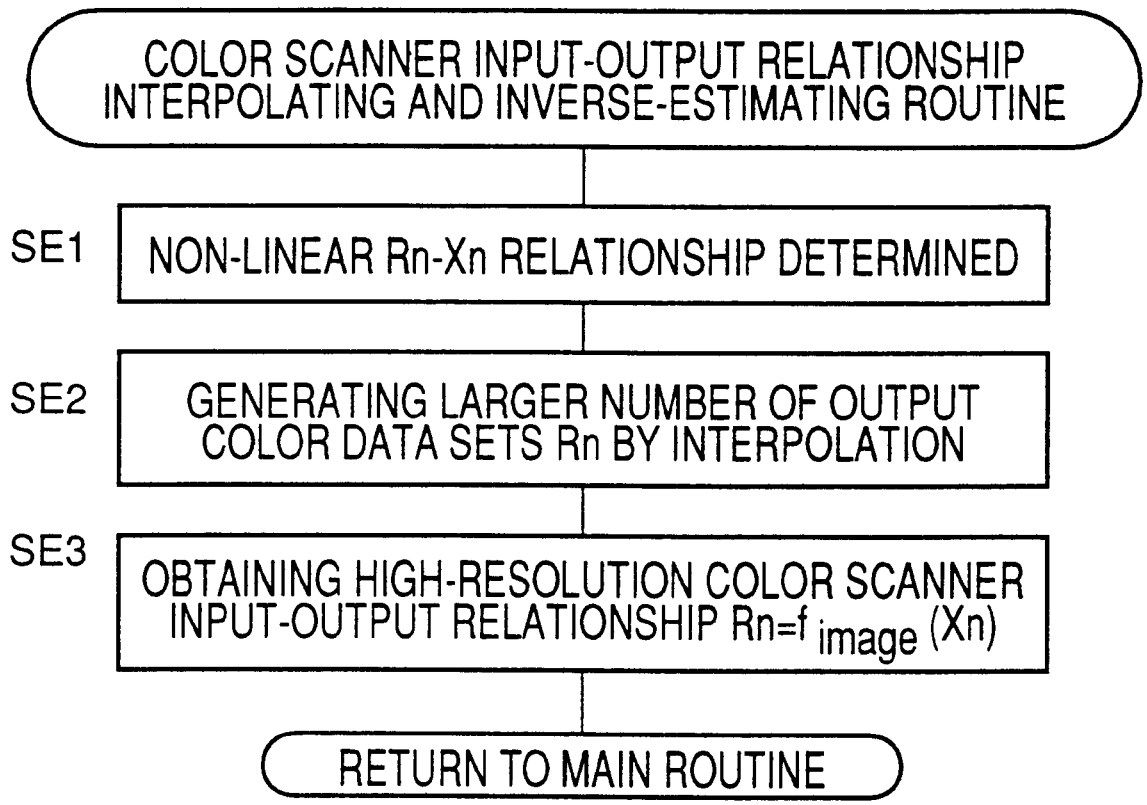

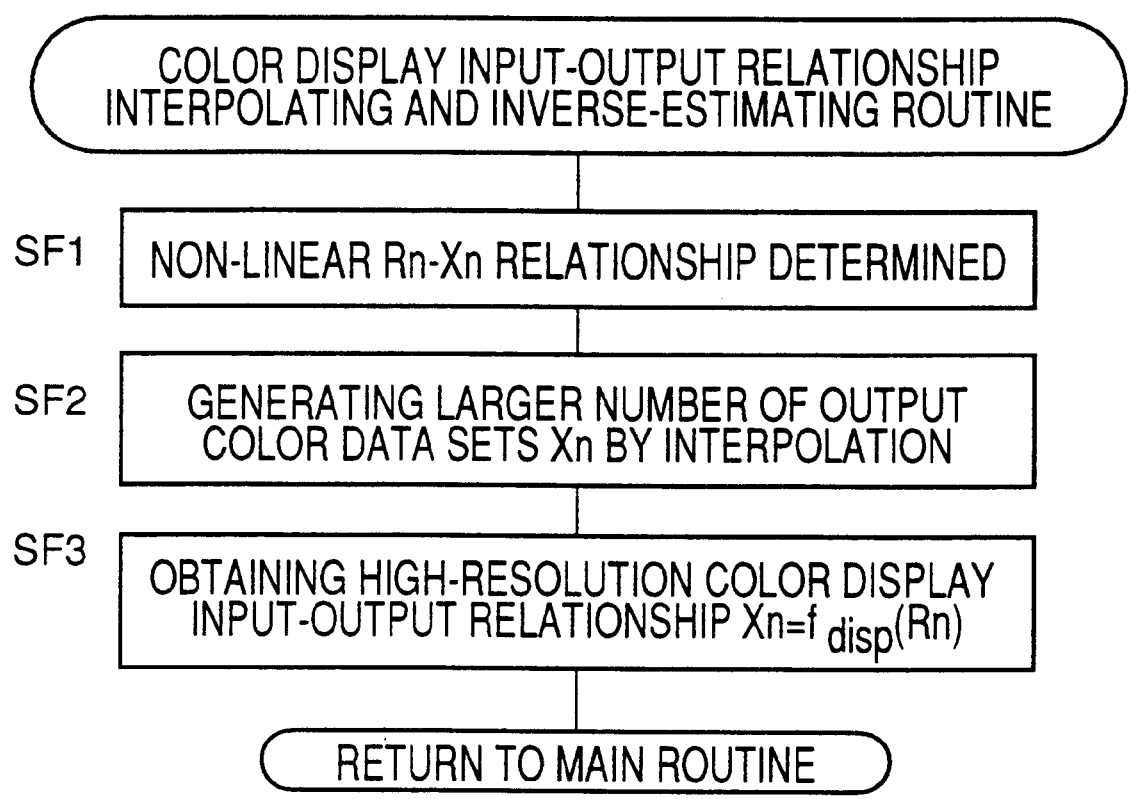

METHOD OF COLOR MATCHING BETWEEN COLOR IMAGE PROCESSING DEVICES, BY INTERPOLATION OF RELATIVELY SMALL NUMBER OF COLOR DATA SETS

This application is based on Japanese Patent Application No. 9-310205, the content of which is incorporated hereinto by reference.

BACKGROUND OF THE INVENTION

1. Field of the Invention

The present invention relates to a method of effecting color matching between an input color data batch inputted to a color image input device and an output color data batch outputted from a color image output device, or between output color data batches outputted from a plurality of color image output devices which are operated according to the same input color data batch.

2. Discussion of the Related Art

There are known various color image output devices such as a CRT (cathode ray tube) display, a color printer and a color copier, which are adapted to reproduce a color image according to an image data batch (internal color data) received from a color image input device such as a color scanner, a digital camera or a digital video camera, which is adapted to read or obtain an original color image (external color data as viewed by an observer). The image data batch or external color data batch consists of a multiplicity of pixel color data sets representative of colors at respective picture elements which collectively define a color image. The original color image (external color data) is reproduced based on those pixel color data sets.

A color image output device as indicated above is capable of reproducing various colors by mixing three pigments having respective three colors consisting of yellow (Y), magenta (M) and cyan (C), or four pigments having respective four colors consisting of yellow, magenta, cyan and black (K), or alternatively by mixing three colors of light of phosphors consisting of red (R), green (G) and blue (B). The pixel color data sets indicated above are generally expressed by a polychromatic system using three or more actually existing primary colors (such as R, G and B, or Y, M, C and K), for instance, by the trichromatic RGB color mixing system. In the RGB color mixing system, color data sets R, G, B consist of a R value, a G value and a B value which represent concentrations of red, green and blue filters. The color image output device uses the R, G and B values for specifying mixing proportions of the three primary colors, to reproduce a color image on a display screen or a recording medium.

It is desired that the colors of the color image as reproduced by the color image output device be consistent or matched with the colors of the original color image whose data batch is outputted from the color image input device and inputted into the image output device, or with the colors of the color images as reproduced by other color image output devices. Generally, however, the color image input and output devices are adjusted or calibrated independently of each other, in terms of the relationship between the color of the original image and the color represented by the color data sets outputted from the color image input device, and the relationship between the color as represented by the color data sets and the color of the color image as reproduced by the color image output device.

On the other hand, the color of an object can be defined by the tristimulus values X, Y and Z in the XYZ chromaticity coordinate system according to the CIE (Commission Internationale de l'Eclairage), based on a relative spectral distribution obtained by a spectrophotometer which photometrically measures the object. Therefore, it is possible to make color matching adjustments of the color image input and output devices, by actually obtaining a predetermined number of measurements of the tristimulus values X, Y, Z in the XYZ chromatic system, and obtaining relationships between these tristimulus values X, Y, Z (external color data) and color data sets r, g, b (internal color data) used by the color output devices. The XYZ chromatic system may be replaced by other chromatic systems such as a (L*, a*, b*) system.

The color image input and output devices employs either a subtractive mixing of colors or an additive mixing of colors, so that the relationships between the tristimulus values X, Y, Z and the color values r, g, b of the color data sets are non-linear. The non-linear relationships make it difficult to obtain functions or inverse functions representative of higher-resolution relationships by interpolating the predetermined number of measurements of the tristimulus values X, Y, Z. It is possible to obtain relationships between the tristimulus values X, Y, Z and the color data values r, g, b, for a large number of combinations of three colors, for instance, $256^3$ combinations. However, this requires a tremendously large number of arithmetic operations to deal with all the combinations and a data memory having an accordingly large storage capacity, and is not actually feasible.

SUMMARY OF THE INVENTION

It is therefore an object of the present invention to provide a method of effecting color matching, with comparatively easy processing of a relatively small volume of existing color data, without requiring a large number of processing operations.

The above object may be achieved according to the principle of the present invention, which provides a method of effecting color matching between external color data of a first image processing device and external color data of a second image processing device connected to the first image processing device, the external color data representing a color image as viewed by an observer and being distinguished from internal color data which represent a color image to be reproduced, the method comprising: (i) a first interpolating and inverse-estimating step of (a) applying to the first image processing device, as a first number of input color data sets, one of a first batch of external color data and a first batch of internal color data of the first image processing device, to obtain a relationship between the first number of input color data sets and a first number of output color data sets which correspond to the first number of the input color data sets and which constitute the other of the first batch of external color data and the first batch of internal color data, (b) generating a second number of output color data sets by interpolation of the first number of output color data sets, the second number being larger than the first number, and (c) effecting an inverse estimation to obtain a second number of input color data sets corresponding to the second number of output color data sets, to obtain a first high-resolution input-output relationship between the second number of input color data sets and the second number of output color data sets which respectively constitute one and the other of a second batch of external color data and a second batch of internal color data; (ii) a second interpolating and inverse-estimating step of (a) applying to the second image processing device, as a first number of input color data sets of the second image processing device, one of a first batch of external color data and a first batch of internal color data of the second image processing device, to obtain a relationship between the first number of input color data sets of the second image processing device and a first number of output color data sets which correspond to the first number of the input color data of the second image processing device and which constitute the other of the first batch of external color data and the first batch of internal color data of the second image processing device, (b) generating a second number of output color data sets of the second image processing device, by interpolation of the first number of output color data sets of the second image processing device, the second number of the output color data sets of the second image processing device being larger than the first number of output color data sets of the second image processing device, and (c) effecting an inverse estimation to obtain a second number of input color data sets corresponding to the second number of output color data sets of the second image processing device, to obtain a second high-resolution input-output relationship between the second number of input color data sets and the second number of output color data sets of the second image processing device which respectively constitute one and the other of a second batch of external color data and a second batch of internal color data of the second image processing device; and (iii) a color data correlation generating step of generating a color data correlationship for converting the first batch of internal color data of the first image processing device into the second batch of internal color data of the second image processing device, according to the first and second high-resolution input-output relationships.

In the method of the present invention described above, the first interpolating and inverse-estimating step is performed to apply to the first image processing device, as a first number of input color data sets, one of a first batch of external color data and a first batch of internal color data of the first image processing device, to obtain a relationship between the first number of input color data sets and a first number of output color data sets which correspond to the first number of the input color data sets and which constitute the other of the first batch of external color data and the first batch of internal color data. Further, a second number of output color data sets are generated by interpolation of the first number of output color data sets. This second number is larger than the first number. Then, an inverse estimation is effected to obtain a second number of input color data sets corresponding to the second number of output color data sets, to obtain a first high-resolution input-output relationship between the second number of input color data sets and the second number of output color data sets, which respectively constitute one and the other of a second batch of external color data and a second batch of internal color data of the first image processing device. The second interpolating and inverse-estimating step is performed to apply to the second image processing device, as a first number of input color data sets of the second image processing device, one of a first batch of external color data and a first batch of internal color data of the second image processing device, to obtain a relationship between the first number of input color data sets of the second image processing device and a first number of output color data sets which correspond to the first number of the input color data of the second image processing device and which constitute the other of the first batch of external color data and the first batch of internal color data of the second image processing device. Further, a second number of output color data sets of the second image processing device is generated by interpolation of the first number of output color data sets of the second image processing device. Then, an inverse estimation is effected to obtain a second number of input color data sets corresponding to the second number of output color data sets of the second image processing device, to obtain a second high-resolution input-output relationship between the second number of input color data sets and the second number of output color data sets of the second image processing device, which respectively constitute one and the other of a second batch of external color data and a second batch of internal color data of the second image processing device.

Then, the color data correlation generating step is performed to generate a color data correlationship for converting the first batch of internal color data of the first image processing device into the second batch of internal color data of the second image processing device, according to the first and second high-resolution input-output relationships, so that the external color data of the first image processing device and the external color data of the second image processing device can be matched with each other.

In a first preferred form of this invention, the method of the present invention further comprises a data converting step for converting the first batch of internal color data of the first image processing device into the second batch of internal color data of the second image processing device, according to the color data correlationship generated in the color data correlation generating step. In this preferred form of the invention, the conversion of the first batch of internal color data of the first image processing device into the second batch of internal color data of the second image processing device according to the color data correlationship permits color matching between the external color data of the first image processing device and the external color data of the second image processing device.

In a second preferred form of this invention, the first image processing device consists of a color image input device, while the second image processing device consists of a color image output device. In this preferred form of the invention, the first interpolating and inverse-estimating step comprises a step of obtaining a relationship between the first number of input color data sets representative of colors of an original image and the first number of output color data sets generated from the color image input device upon application of the first number of input color data sets thereto, a step of generating the second number of output color data sets by interpolation of the first number of output color data sets, such that the second number of output color data sets have a substantially constant color difference interval, and a step of effecting the inverse estimation to obtain the second number of input color data sets corresponding to the second number of output color data sets, to obtain the first high-resolution input-output relationship of the color image input device. Further, the second interpolating and inverse-estimating step comprises a step of obtaining a relationship between the first number of input color data sets of the color image output device and the first number of output color data sets generated from the color image output device upon application of the first number of input color data sets thereto, a step of generating the second number of output color data sets by interpolation of the first number of output color data sets of the color image output device, such that the second number of output color data sets of the image output device have a substantially constant color difference interval, and a step of effecting the inverse estimation to obtain the second number of input color data sets corresponding to the second number of output color data sets of the color output device, to obtain the second high-resolution input-output relationship of the color image output device. In the above second preferred form of the method of the invention, the color data correlationship generating step comprises a step of generating a color data converting table for converting the second number of the output color data sets of the color image input device into the second number of the input color data sets of the color image output device, according to the first and second high-resolution input-output relationships. In this preferred form of the invention, the conversion of the second number of the output color data sets of the color image input device into the second number of the input color data sets of the color image output device permits color matching between the colors of the original image as represented by the input color data sets of the color image input device and the colors as represented by the output color data sets of the color image output device, that is, the colors of a color image as reproduced by the color image output device according to the input color data sets of the color image output device.

In one advantageous form of the above second preferred form of this invention, the method comprises a data converting step for converting second number of output color data sets of color image input device into second number of input color data sets of color image output device according to color data converting table. The conversion of the output color data sets of the color image input device into the input color data sets of the color image output device according to the color data converting table generated in the color data converting step permits color matching between the colors of the original image as represented by the input color data sets of the color image input device and the colors as represented by the output color data sets of the color image output device, namely, the colors of the color image reproduced by the color image output device.

In a third preferred form of this invention, the first image processing device consists of a first color image output device, while the second image processing device consists of a second color image output device. In this form of the method of the invention, the first interpolating and inverse-estimating step comprises a step of obtaining a relationship between the first number of input color data sets of the first color image output device and the first number of output color data sets generated from the first color image output device upon application of the first number of input color data sets thereto, a step of generating the second number of output color data sets by interpolation of the first number of output color data sets, such that the second number of output color data sets have a substantially constant color difference interval, and a step of effecting the inverse estimation to obtain the second number of input color data sets corresponding to the second number of output color data sets, to obtain the first high-resolution input-output relationship of the first color image output device. Further, the second interpolating and inverse-estimating step comprises a step of obtaining a relationship between the first number of input color data sets of the second color image output device and the first number of output color data sets generated from the second color image output device upon application of the first number of input color data sets thereto, a step of generating the second number of output color data sets by interpolation of the first number of output color data sets of the color image output device, such that the second number of output color data sets of the image output device have a substantially constant color difference interval, and a step of effecting the inverse estimation to obtain the second number of input color data sets corresponding to the second number of output color data sets of the color output device, to obtain the second high-resolution input-output relationship of the second color image output device. The color data correlationship generating step comprises a step of generating a color data converting table for converting the second number of the input color data sets of the first color image output device into the second number of the input color data sets of the second color image output device, according to the first and second high-resolution input-output relationships. The conversion of the input color data sets of the first color image output device into the input color data sets of the second color image output device according to the color data converting table permits color matching between the colors as represented by the output color data sets of the first color image output device and the colors as represented by the output color data sets of the second color image output device, namely, between the color image as reproduced by the first color image output device and the colors of the color image as reproduced by the second color image output device.

In one advantageous arrangement of the above third preferred form of this invention, the method further comprises a data converting step for converting the second number of the input color data sets of the first color image output device into the second number of the input color data sets of the second color image output device according to the color data converting table. This arrangement permits the color matching between the colors of the color image as reproduced by the first color image output device and the colors of the color image as reproduced by the second color image output device.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which:

FIG. 11 is a flow chart illustrating a color scanner input-output relationship interpolating and inverse-estimating routine executed in step SD2 of the routine of FIG. 9; and FIG. 12 is a flow chart illustrating a color display input-output relationship interpolating and inverse-estimating routine executed in step SD4 of the routine of FIG. 9.

DETAILED DESCRIPTION OF THE PREFERRED EMBODIMENT

Figure 1:
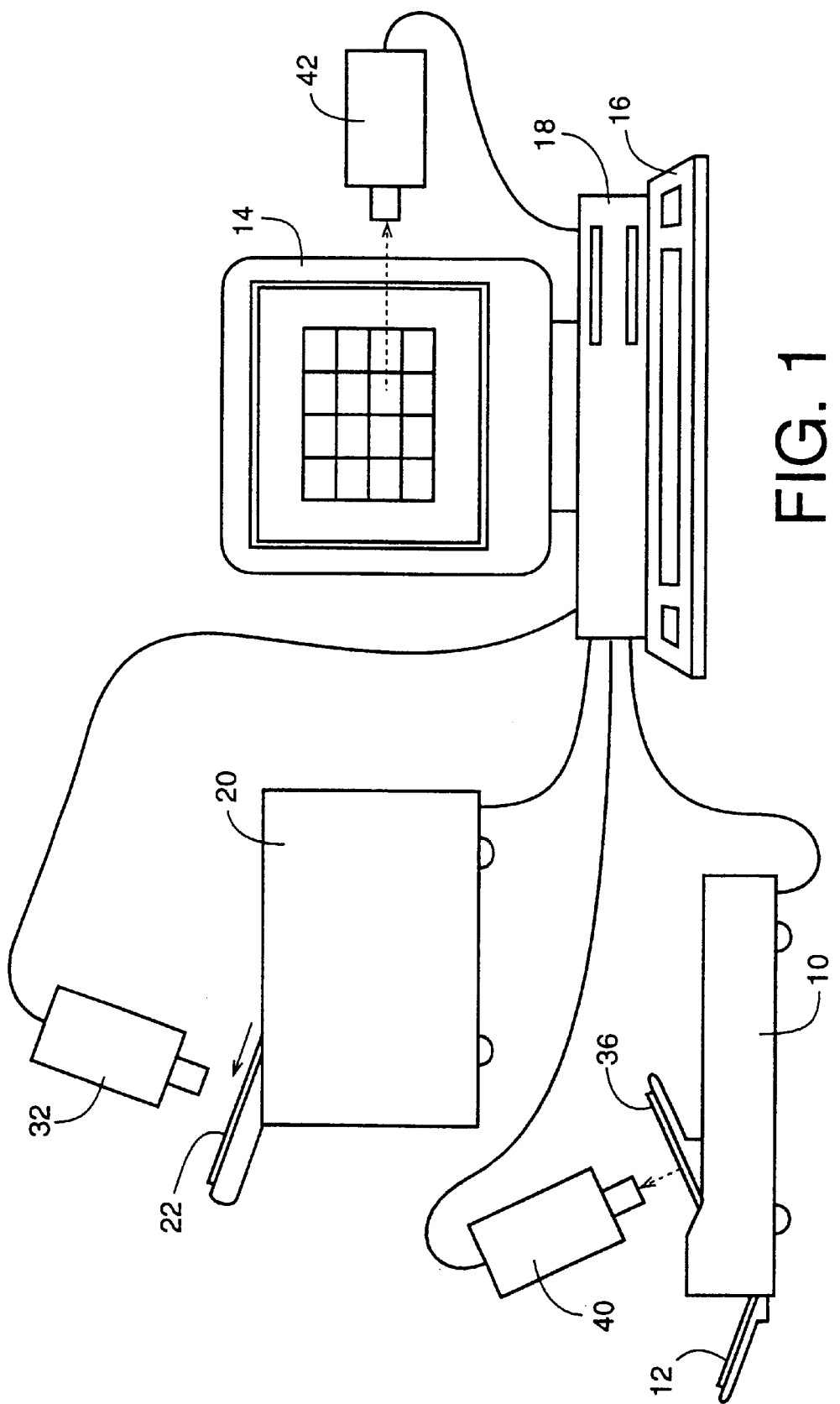
FIG. 1 is a view illustrating an example of a color image input and output apparatus capable of practicing a color matching method according to the principle of this invention.

Referring first to FIG. 1, there is shown a color image input and output apparatus adapted to practice a color matching method according to one embodiment of this invention. The color image input and output apparatus includes a color scanner 10 in the form of a color image reader, for instance, which is capable of functioning as a color image input device for optically reading an original color image on an original 12 and providing an output in the form of an image signal SG1 representative of the original color image.

Figure 6:
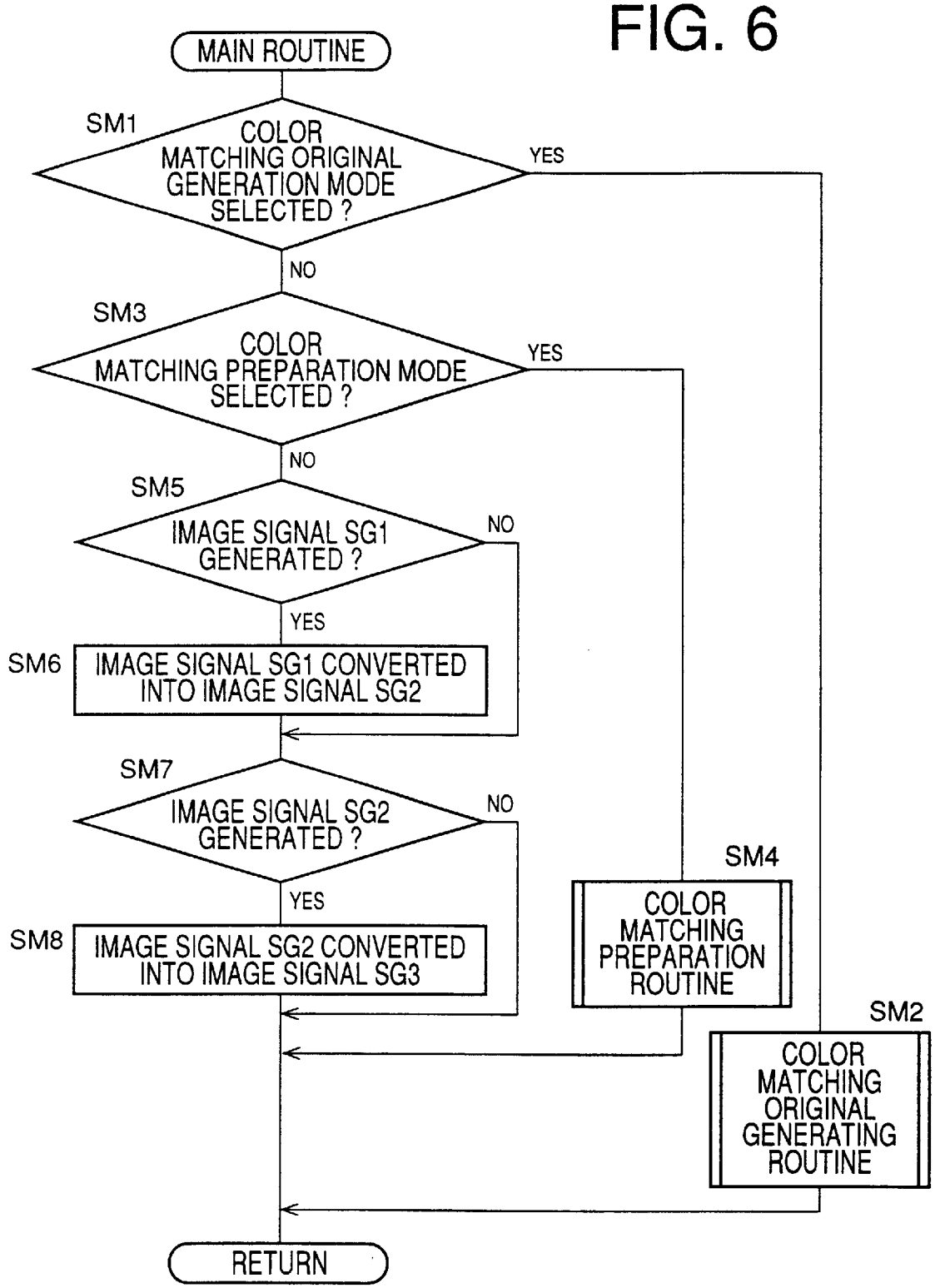
FIG. 6 is a flow chart illustrating a main routine executed by the color image input and output apparatus of FIG. 1.

The apparatus further includes an electronic control device in the form of a computer 18 provided with a color display device 14 and a keyboard 16, and further includes a color copier 20. The computer 18, which receives the image signal SG1, incorporates a central processing unit (CPU), a read-only memory (ROM), a random-access memory (RAM) and an interface. The CPU operates to process input signals including the image signal SG1, in a selected one of operation modes, according to control programs stored in the ROM, while utilizing a temporary data storage function of the RAM. The operation modes include a color matching preparation mode in which a color matching preparation routine of FIG. 9 (step SM2 of a main routine of FIG. 6) is executed to generate a first color data conversion table and a second color data conversion table, as described below in detail. The operation modes also include a normal mode in which steps SM6 and SM8 of the main routine of FIG. 6 is executed to convert the image signal SG1 into an image signal SG2 according to the first color data conversion table, and to convert the image signal SG2 into an image signal SG3, so that the image signal SG3 is used by the color copier 20.

The color display device 14, which may be a CRT display or a liquid crystal display, functions as a color image output device capable of displaying a color image on a display screen thereof, according to the image signal SG2 received from the computer 18. The color copier 20, which may be a so-called "color ink jet printer", functions as a color image output device capable of reproducing a color image on a recording medium 22 in the form of a sheet of paper, for example, according to the image signal SG3 received from the computer 18.

Each of the image signals SG1, SG2, SG3 consists of a multiplicity of pixel color data sets representative of colors at respective picture elements which collectively define a color image. Each pixel color data set is expressed by a polychromatic system such as a trichromatic system using known primary colors. In the trichromatic system, the three primary colors consist of red (R), green (G) and blue (B), or yellow (Y), magenta (M) and cyan (C). Generally, the trichromatic RGB color mixing system using the three primary colors R, G and B is used for the pixel color data sets, namely, for the image signals SG1, SG2 and SG3. The color display device 14 is adapted to reproduce various colors by additive mixing of the three primary colors R, G, B. Therefore, the image signal SG2 in the form of the pixel color data sets according to the trichromatic RGB color mixing system can be used directly by the color display device 14. However, the color display device 14 usually incorporates a color compensating circuit for color compensation in view of the light emitting characteristics of the phosphors. The color copier 20 is adapted to reproduce various colors by subtractive mixing of the three primary colors Y, M, C. Therefore, the image signal SG3 in the form of the pixel color data sets according to the trichromatic RGB color mixing system, which is received by the color copier 20, must be converted into an image signal in the form of pixel color data sets according to the trichromatic color mixing system using the three primary colors Y, M, C.

Each pixel color data set according to the trichromatic RGB color mixing system is expressed by Rn (=Rm, Gm, Bm), wherein values Rm, Gm and Bm represent mixing ratios or concentrations of the three primary colors R, G and B, respectively. On the other hand, each pixel color data set according to the trichromatic YMC color mixing system is expressed by Yn (=Ym, Mm, Cm), wherein values Ym, Mm and Cm represent mixing ratios or concentrations of the three primary colors Y, M and C, respectively. For example, the color data set Rn or Yn represents one of $256^3$ different colors, where the mixing ratio of each of the three primary colors is expressed or changes in 256 steps. In this case, "m" changes from 0 to "255", while "n" changes from 1 to $256^3$.

Figure 2:
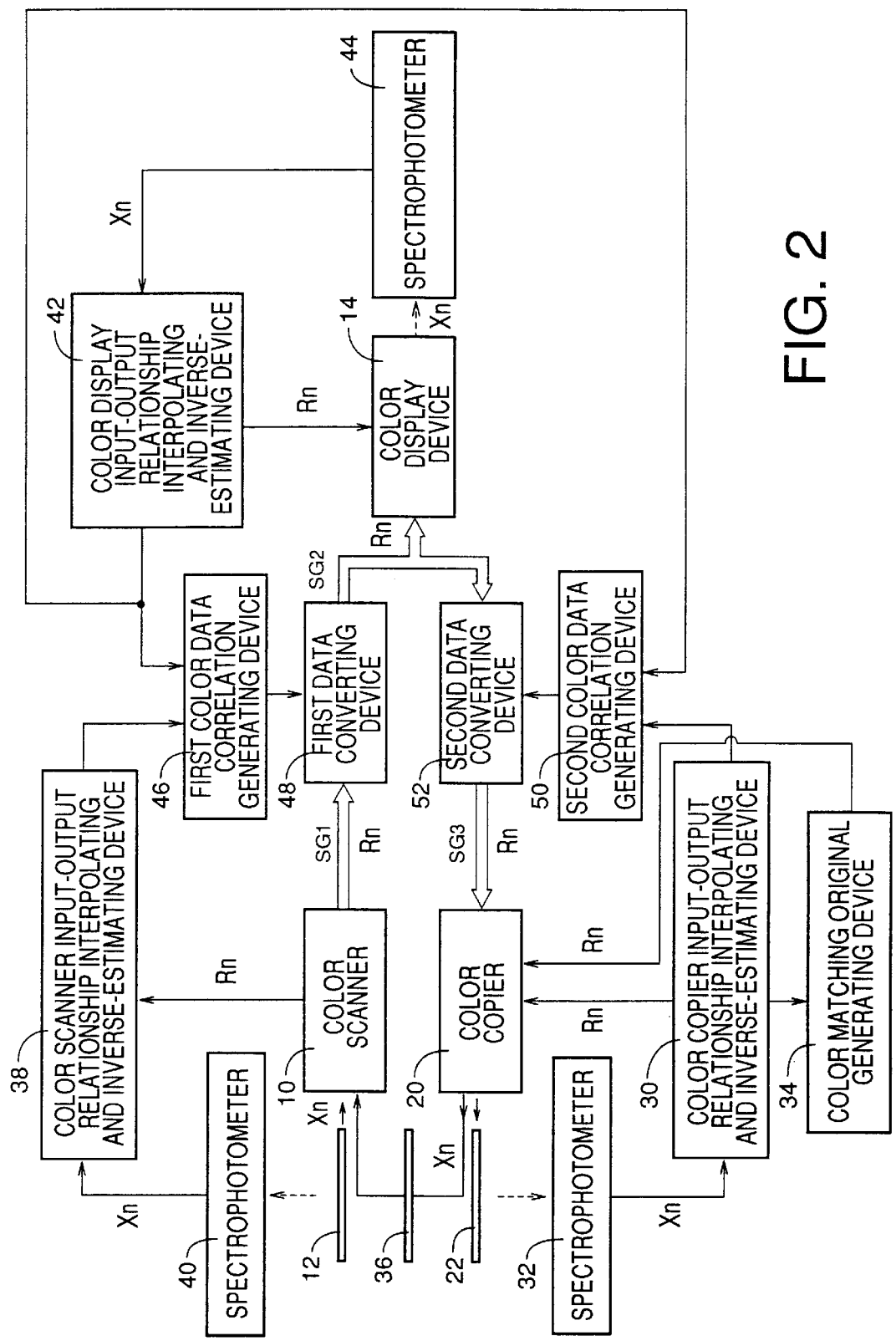
FIG. 2 is a block diagram showing color image input and output devices and various control devices adapted to perform various functions in the color image input and output apparatus of FIG. 1.

Referring next to the block diagram of FIG. 2, the color image input and output apparatus further includes: a color copier input-output relationship interpolating and inverse-estimating device 30; a spectrophotometer 32; a color matching original generating device 34 for generating a color matching original 36; a color scanner input-output relationship interpolating and inverse-estimating device 38, a spectrophotometer 40; a color display input-output relationship interpolating and inverse-estimating device 42; a spectrophotometer 44; a first color data correlation generating device 46; a first data converting device 48; a second color data correlation generating device 50; and a second data converting device 52.

The computer 18 incorporates the color copier input-output relationship interpolating and inverse-estimating device 30, color matching original generating device 34, color scanner input-output relationship interpolating and inverse-estimating device 38, color display input-output relationship interpolating and inverse-estimating device 42, first and second color data correlationship generating devices 46, 50 and first and second data converting devices 48, 52.

The color copier input-output relationship interpolating and inverse-estimating device 30 is arranged to perform an interpolating and inverse-estimating step for obtaining a high-resolution color copier input-output relationship $Xn=f_{copy}(Rn)$, by interpolation and inverse estimation, as described below.

Figure 3:
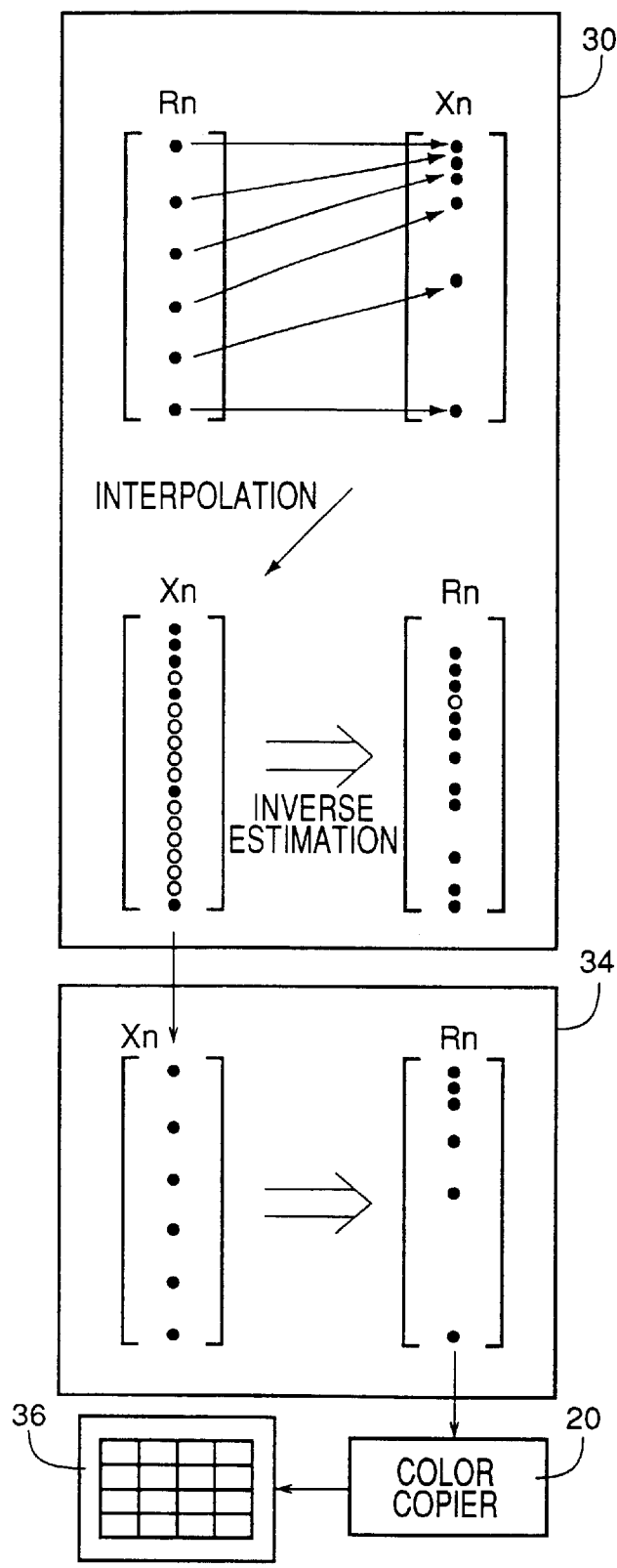
FIG. 3 is a view for explaining an interpolating and inverse-estimating function performed by a color copier input-output relationship interpolating and inverse-estimating device shown in FIG. 2.

For instance, the color copier input-output relationship interpolating and inverse-estimating device 30 is adapted to apply 125 input color data sets Rn (n=1~125) to the color copier 20. The 125 input color data sets Rn are obtained by changing each of the three values R, G and B in five steps (m=0, 61, 127, 191 and 255), such that the five values m of each value R, G, B have a predetermined color difference interval. The device 30 activates the spectrophotometer 32 to photometrically measure a color image reproduced on the recording medium 32 by the color copier 20. From the spectrophotometer 32, the device 30 receives 125 tristimulus color data sets Xn (n=1~125) each consisting of the tristimulus values X, Y and Z in the CIE chromaticity coordinate system. The relationship between the 125 input color data sets Rn and the 125 output color data sets Xn obtained by measurement is not linear, as schematically indicated in the upper part of the uppermost rectangular block in FIG. 3, due to the color production by the color copier 20 according to the subtractive color mixing system.

Then, the color copier input-output relationship interpolating and inverse-estimating device 30 obtains the high-resolution input-output relationship $Xn=f_{copy}(Rn)$ between a larger number of input color data sets Rn and the corresponding large number of output color data sets Xn for the color copier 20. Described more specifically, the device 30 operates to obtain a larger number of output color data sets Xn by interpolation of the 125 output color data sets Xn, as indicated by "o" marks in the lower part of the uppermost block in FIG. 3, such that the values "n" of the larger number of output color data sets Xn change at a predetermined interval between "1" and "256". Then, the device 30 operates to effect an inverse estimation to obtain a larger number of input color data sets Rn corresponding to the thus obtained larger number of output color data sets Xn having the predetermined interval. Thus, the high-resolution input-output relationship $Xn=f_{copy}(Rn)$ of the color copier is obtained by the device 30.

As described above, the color copier input-output relationship interpolating and inverse-estimating device 30 is adapted to apply to the color copier 20 a selected first number of input color data sets Rn [=f(R, G, B)] having a predetermined color difference interval, so that the color copier 20 provides the first number of corresponding output color data Xn [=f(X, Y, Z)] each consisting of the tristimulus values X, Y and Z. Thus, a relationship between the first number of input color data sets Rn and the first number of output color data sets Xn is obtained. The device 30 generates a second number of output color data sets Xn by interpolation of the 125 output color data sets Xn. The second number is considerably larger than the first number.

The device 30 then effects an inverse estimation to obtain the second number of input color data sets Rn corresponding to the thus obtained second number of output color data sets Xn, and thereby obtain the high-resolution input-output relationship $Xn=f_{copy}(Rn)$ of the color copier 20.

It is to be understood that, for the color copier 20, the output color data sets Xn are considered as external color data sets representative of colors of a color image as reproduced on the recording medium 22 and as viewed by an observer, while the input color data sets Rn are considered as internal color data sets which are processed within the color copier 20 to reproduce a color image, that is, which represent a color image to be reproduced.

The interpolating and inverse-estimating step is a series of operations to solve an inverse problem, namely, to estimate input values from output values. The operations are based on a known relationship between a first number of input values and the same number of output values, and includes an operation to obtain a second number of output values, by interpolation of the first number of output values. The second number may be the maximum number of input values that can be used by the color image input or output device, or may be equal to a number of output values large enough to assure a practically satisfactory high degree of density of the picture elements or color image resolution. The thus obtained second number of output values are used to obtain the second number of corresponding input values. Generally, the estimation of input values from output values requires avoiding inadequate conditions that prevent: singularity of a solution, namely, existence of only one input value for one output value; assurance of existence of a solution, namely, existence of an input value for each output value; and stability of a solution, namely, a sufficiently large amount of change of the input value corresponding to a relatively small amount of change of the output value. These inadequate conditions can be effectively avoided according to the interpolation and inverse estimation according to the principle of this invention wherein the second number of output values (values of the output color data sets) which are obtained by interpolation and which are used to estimate the corresponding input values (input color data sets) is large enough to assure a sufficiently small color difference interval between the adjacent output values, in order to hold possible inconsistency of correspondence between the output and input values within a tolerable range.

The color matching original generating device 34 is arranged to generate or produce the color matching original 36 which carries a predetermined number of different colors (125 colors, for instance) at respective local positions. The different colors are expressed by tristimulus values Xm, Ym and Zm in the CIE chromaticity coordinate system, and are determined so that the values Xm, Ym, Zm change at a predetermined interval, as described above with respect to the device 30. For instance, the device 34 is arranged to select the 125 output color data sets Xn from among the output color data sets Xn of the high-resolution input-output relationship $Xn=f_{copy}(Rn)$ obtained by the color copier input-output relationship interpolating and inverse-estimating device 30, as indicated in the intermediate rectangular block in FIG. 3. The selected output color data sets Xn have a predetermined color difference interval. Then, the device 34 determines the input color data sets Rn corresponding to the selected output color data sets Xn, according to the high-resolution input-output relationship $Xn=f_{copy}(Rn)$ obtained by the device 30. The device 34 applies the thus determined input color data sets Rn to the color copier 20, so that the color matching original 36 is obtained with a color image reproduced on the recording medium 22. The thus produced color matching original 36 bears the 125 colors at respective local positions, which are represented by the respective output color data sets Xn corresponding to the respective 125 input color data sets Rn applied to the color copier 20.

The color scanner input-output relationship interpolating and inverse-estimating device 38 is arranged to perform an interpolating and inverse-estimating step for obtaining a high-resolution color copier input-output relationship $Rn=f_{image}(Xn)$, by interpolation and inverse estimation, as described below.

Figure 4:
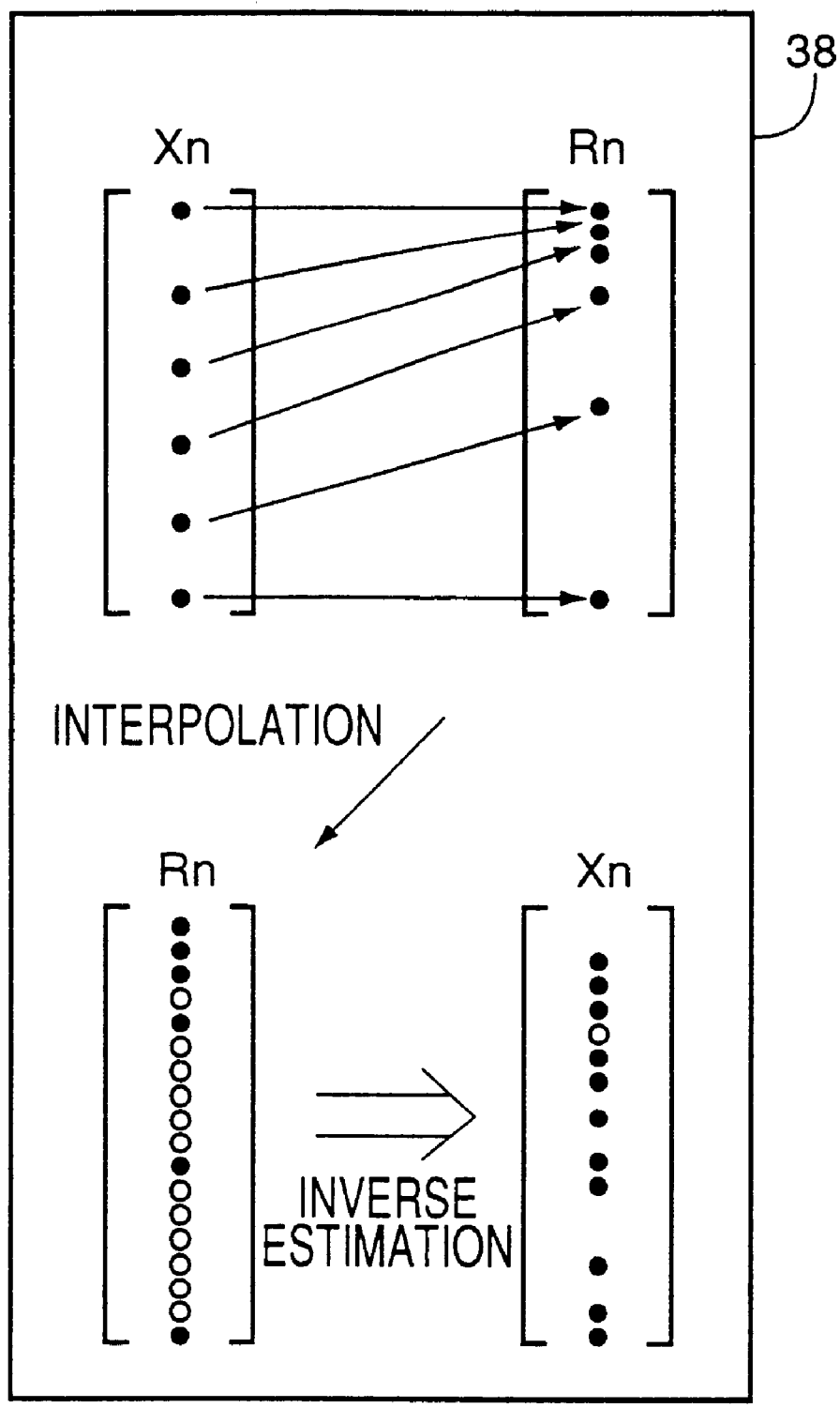
FIG. 4 is a view for explaining an interpolating and inverse-estimating function performed by a color scanner input-output relationship interpolating and inverse-estimating device.

For instance, the color scanner input-output relationship interpolating and inverse-estimating device 38 is adapted to activate the spectrophotometer 40 to photometrically measure 125 different colors on the color matching original 36, or is adapted to receive 125 color data sets Xn selected by the color matching original generating device 34. Thus, the device 38 obtains 125 tristimulus input color data sets Xn (n=1, 2, 3, . . . 125) each consisting of the tristimulus values X, Y and Z in the CIE chromaticity coordinate system. The five values m of each value X, Y, Z have a predetermined color difference interval. The device 38 activates the color scanner 10 to read the color image on the color matching original 36. From the color scanner 10, the device 38 receives 125 output color data sets Rn (n=1, 2, 3, . . . 125). The relationship between the 125 input color data sets Xn and the 125 output color data sets Rn obtained by measurement is not linear, as schematically indicated in the upper part of the uppermost rectangular block in FIG. 4, due to the color reading by the color scanner 10 according to the additive color mixing system.

Then, the color scanner input-output relationship interpolating and inverse-estimating device 38 obtains the high-resolution input-output relationship Rn=$f_{imag}$(Xn) between a large number of input color data sets Xn and the corresponding large number of output color data sets Rn of the color scanner 10. Described more specifically, the device 38 operates to obtain a larger number of output color data sets Rn by interpolation of the 125 output color data sets Rn, as indicated by "o" marks in the lower part of the block in FIG. 4, such that the values "n" of the larger number of output color data sets Rn change at a predetermined interval between "1" and "256". Then, the device 38 operates to effect an inverse estimation to obtain a larger number of input color data sets Xn corresponding to the thus obtained larger number of output color data sets Rn having the predetermined interval. Thus, the high-resolution input-output relationship Rn=$f_{imag}$(Xn) of the color scanner 10 is obtained by the device 38.

As described above, the color scanner input-output relationship interpolating and inverse-estimating device 38 is adapted to apply to the color scanner 10 a selected first number of input color data sets Xn [=f(X, Y, Z)] having a predetermined color difference interval and each consisting of tristimulus values X, Y and Z, so that the color scanner 10 provides the first number of corresponding output color data sets Rn [=f(R, G, B)]. Thus, a relationship between the first number of input color data sets Xn and the first number of output color data sets Rn is obtained. The device 38 generates a second number of output color data sets Rn by interpolation of the 125 output color data sets Rn. The second number is considerably larger than the first number. The device 38 then effects an inverse estimation to obtain the second number of input color data sets Xn corresponding to the thus obtained second number of output color data sets Rn, and thereby obtain the high-resolution input-output relationship Rn=$f_{imag}$(Xn) of the color scanner 10.

It is to be understood that, for the color scanner 10, the input color data sets Xn are considered as external color data sets representative of colors of a color image as reproduced on the color matching original 36 and as viewed by an observer, while the output color data Rn are considered as internal color data sets which are obtained by processing within the color scanner 10 to produce an output, namely, which represent a color image to be reproduced by the color display device 14 or color copier 20.

The color display input-output relationship interpolating and inverse-estimating device 42 is arranged to perform an interpolating and inverse-estimating step for obtaining a high-resolution color copier input-output relationship Xn=$f_{disp}$(Rn), by interpolation and inverse estimation, as described below.

Figure 5:
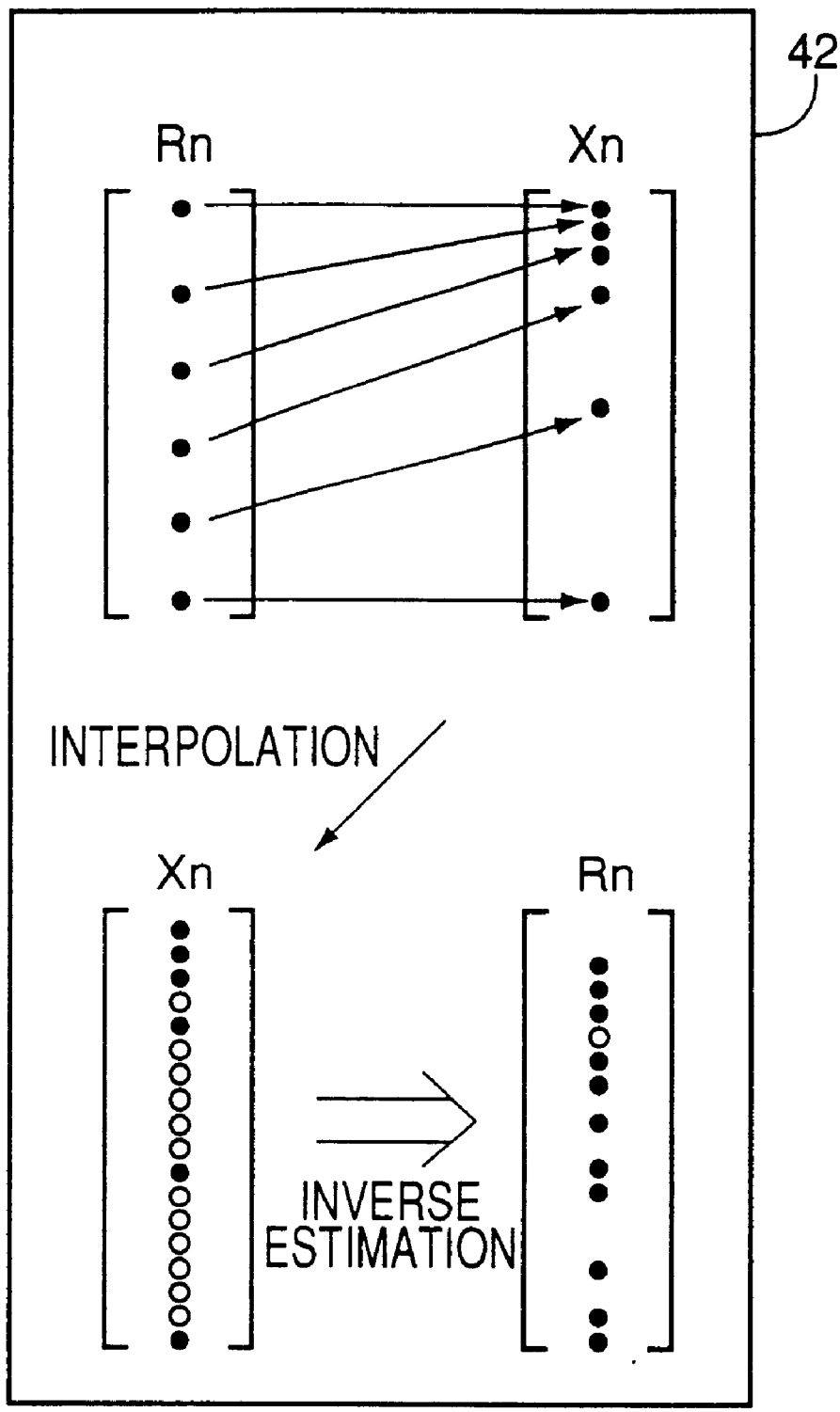
FIG. 5 is a view for explaining an interpolating and inverse-estimating function performed by a color display input-output relationship interpolating and inverse-estimating device.

For instance, the color display input-output relationship interpolating and inverse-estimating device 42 is adapted to apply 125 input color data sets Rn (n=1, 2, 3, . . . 125) to the color display 14. The 125 input color data sets Rn are obtained by changing each of the three values R, G and B in five steps (m=0, 63, 127, 191, 255), such that the five values m of each value R, G, B have a predetermined color difference interval. The device 42 activates the spectrophotometer 44 to photometrically measure a color image reproduced on the screen of the color display device 14. From the spectrophotometer 44, the device 42 receives 125 tristimulus color data sets Xn (n=1, 2, 3, . . . 125) each consisting of the tristimulus values X, Y and Z in the CIE chromaticity coordinate. The relationship between the 125 input color data sets Rn and the 125 output color data sets Xn obtained by measurement is not linear, as indicated in the upper part of the rectangular block in FIG. 5, due to the color production by the color display device 14 according to the additive color mixing system.

Then, the color display input-output relationship interpolating and inverse-estimating device 42 obtains the high-resolution input-output relationship Xn=$f_{disp}$(Rn) between a large number of input color data sets Rn and the corresponding large number of output color data sets Xn for the color display device 14. Described more specifically, the device 42 operates to obtain a large number of output color data sets Xn by interpolation of the 125 output color data sets Xn, as indicated by "o" marks in the lower part of the block in FIG. 5, such that the values "n" of the larger number of output color data sets Xn change at a predetermined interval between "1" and "256". Then, the device 42 operates to effect an inverse estimation to obtain a large number of input color data sets Rn corresponding to the thus obtained large number of output color data sets Xn having the predetermined interval. Thus, the high-resolution input-output relationship Xn=$f_{disp}$(Rn) of the color display device 14 is obtained by the device 42.

As described above, the color display input-output relationship interpolating and inverse-estimating device 42 is adapted to apply to the color display device 14 a selected first number of input color data sets Rn [=f(R, G,)] having a predetermined color difference interval, so that the color display device 14 provides the first number of corresponding output color data Xn [=f(X, Y, Z)] each consisting of the tristimulus values X, Y and Z. Thus, a relationship between the first number of input color data sets Rn and the first number of output color data sets Xn is obtained. The device 42 generates a second number of output color data sets Xn by interpolation of the 125 output color data sets Xn. The second number is considerably larger than the first number. The device 42 then effects an inverse estimation to obtain the second number of input color data sets Rn corresponding to the thus obtained second number of output color data sets Xn, and thereby obtain the high-resolution input-output relationship Xn=$f_{disp}$(Rn) of the color display device 14.

It is to be understood that, for the color display device 14, the output color data sets Xn are considered as external color data sets representative of colors of a color image as reproduced on the recording medium 22 and as viewed by a observer, while the input color data Rn are considered as internal color data sets which are processed within the color display device 14 to reproduce a color image, namely, which represent a color image to be reproduced.

The first color data correlation generating device 46 is adapted to perform a first color data correlation generating step for generating a first color data correlationship Rn(SG2)=f(Rn(SG1)) for converting the image signal SG1 consisting of the output color data sets Rn(SG1) received from the color scanner 10, into the image data SG2 consisting of input color data sets Rn(SG2) to be supplied to the color display device 14. The device 46 generates the first color data correlationship Rn(SG2)=f(Rn(SG1)), according to the high-resolution input-output relationship $Rn=f_{imag}(Xn)$ obtained by the color scanner input-output relationship interpolating and inverse-estimating device 38, and the high-resolution input-output relationship $Xn=f_{disp}(Rn)$ obtained by the color display input-output relationship interpolating and inverse-estimating device 42. That is, the input color data sets Xn for the color scanner 10 and the output color data sets Xn for the color display device 14 must be matched with each other. To this end, the high-resolution input-output relationships $Rn=f_{imag}(Xn)$ and $Xn=f_{disp}(Rn)$ are processed, so as to eliminate the parameter Xn, to obtain the first color data correlationship $Rn(SG2)=f(Rn(SG1))$.

The first data converting device 48 is adapted to perform a step of converting the image signal SG1 or output color data sets Rn(SG1) received from the color scanner 10, into the image signal SG2 or input color data sets Rn(SG2) to be applied to the color display device 14, according to the first color data correlationship $Rn(SG2)=f(Rn(SG1))$ generated by the first color data correlation generating device 46. This first color data correlation generating step is performed each time the device 46 receives the image signal SG1 from the color scanner 10.

The second color data correlation generating device 50 is adapted to perform a second color data correlation generating step for generating a second color data correlationship $Rn(SG3)=f(Rn(SG2))$ for converting the image signal SG2 consisting of the input color data sets Rn(SG2) received from the first data converting device 48, into the image data SG3 consisting of input color data sets Rn(SG3) to be supplied to the color copier 20. The device 50 generates the second color data correlationship $Rn(SG3)=f(Rn(SG2))$, according to the high-resolution input-output relationship $Xn=f_{disp}(Rn)$ obtained by the color display input-output relationship interpolating and inverse-estimating device 42, and the high-resolution input-output relationship $Xn=f_{copy}(Rn)$ obtained by the color copier input-output relationship interpolating and inverse-estimating device 30. That is, the input color data sets Rn for the color display device 14 and the input color data sets Rn for the color copier 20 must be matched with each other. To this end, the high-resolution input-output relationships $Xn=f_{disp}(Rn)$ and $Xn=f_{copy}(Rn)$ are processed, so as to eliminate the parameter Rn, to obtain the second color data correlationship $Rn(SG3)=f(Rn(SG2))$.

The second data converting device 52 is adapted to perform a step of converting the image signal SG2 or input color data sets Xn(SG2) received from the first data converting device 48, into the image signal SG3 or input color data sets Rn(SG3) to be applied to the color copier 20, according to the second color data correlationship $Rn(SG3)=f(Rn(SG2))$ generated by the second color data correlation generating device 50. This second color data correlation generating step is performed each time the device 52 receives the image signal SG2 from the first data converting device 48.

Figure 7:
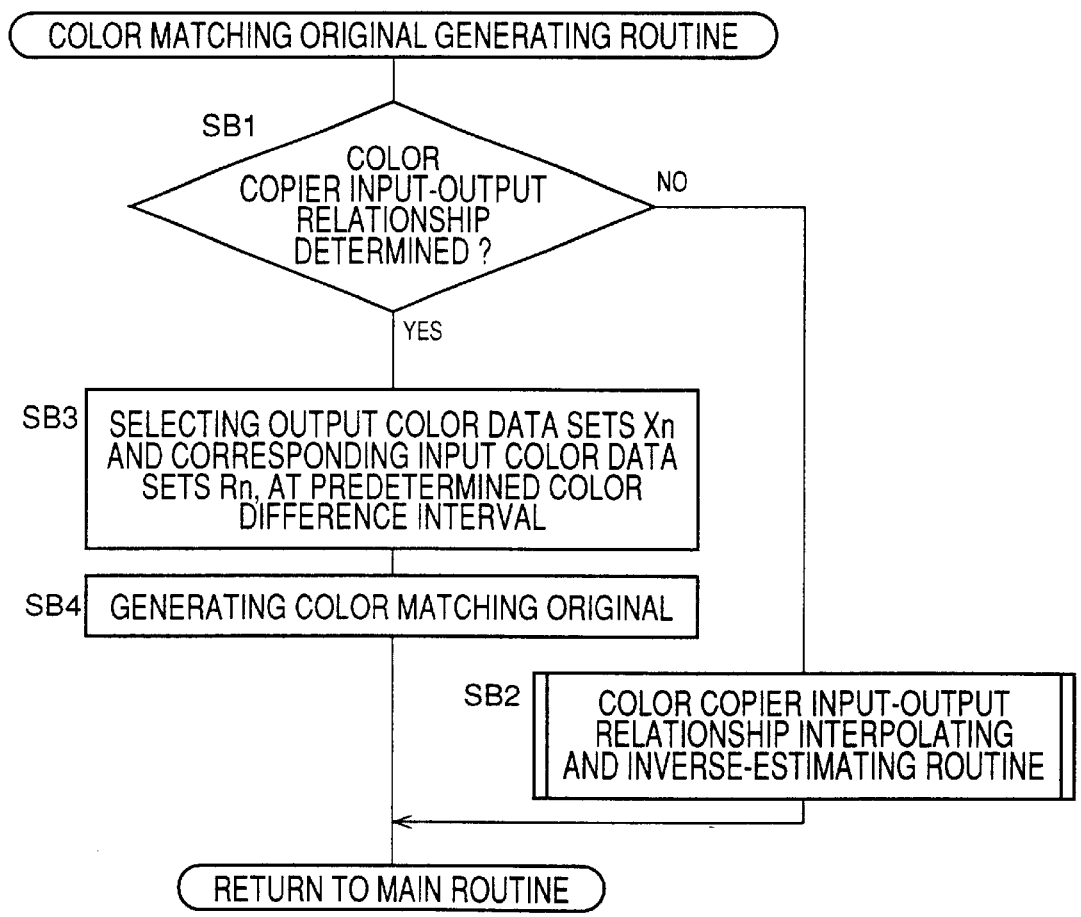
FIG. 7 is a flow chart illustrating a color matching original generating routine executed in step SM2 of the main routine of FIG. 6.
Figure 8:
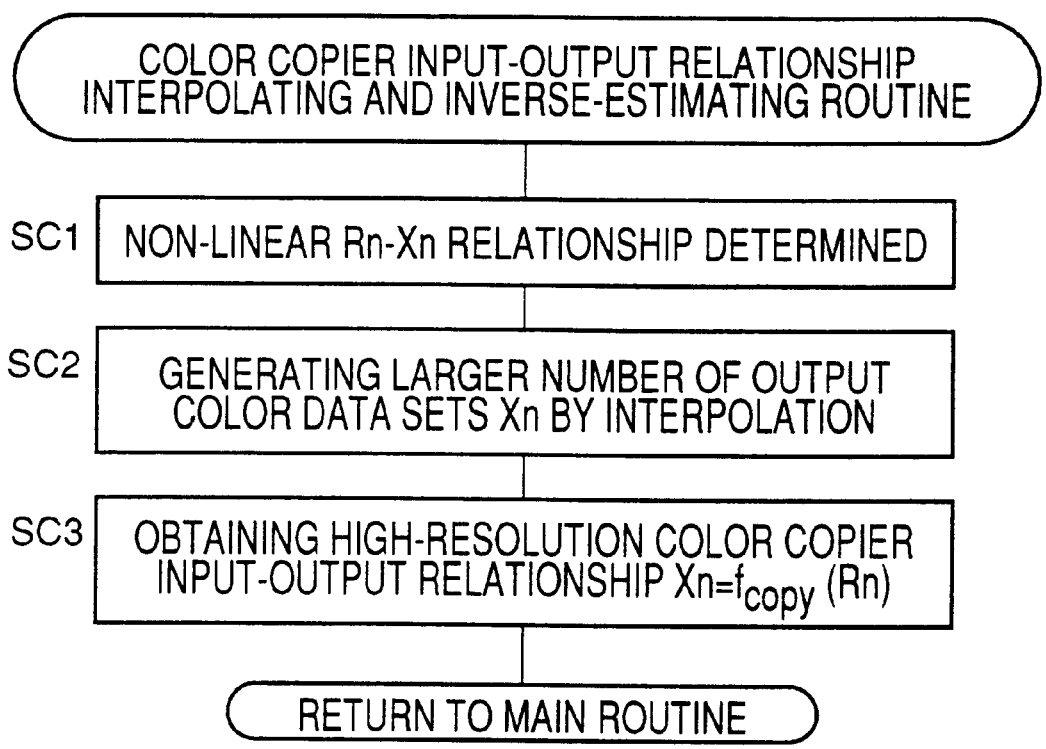
FIG. 8 is a flow chart illustrating a color copier input-output relationship interpolating and inverse-estimating routine executed in step SB2 of the routine of FIG. 7 and in step SD6 of a routine of FIG. 9.
Figure 9:
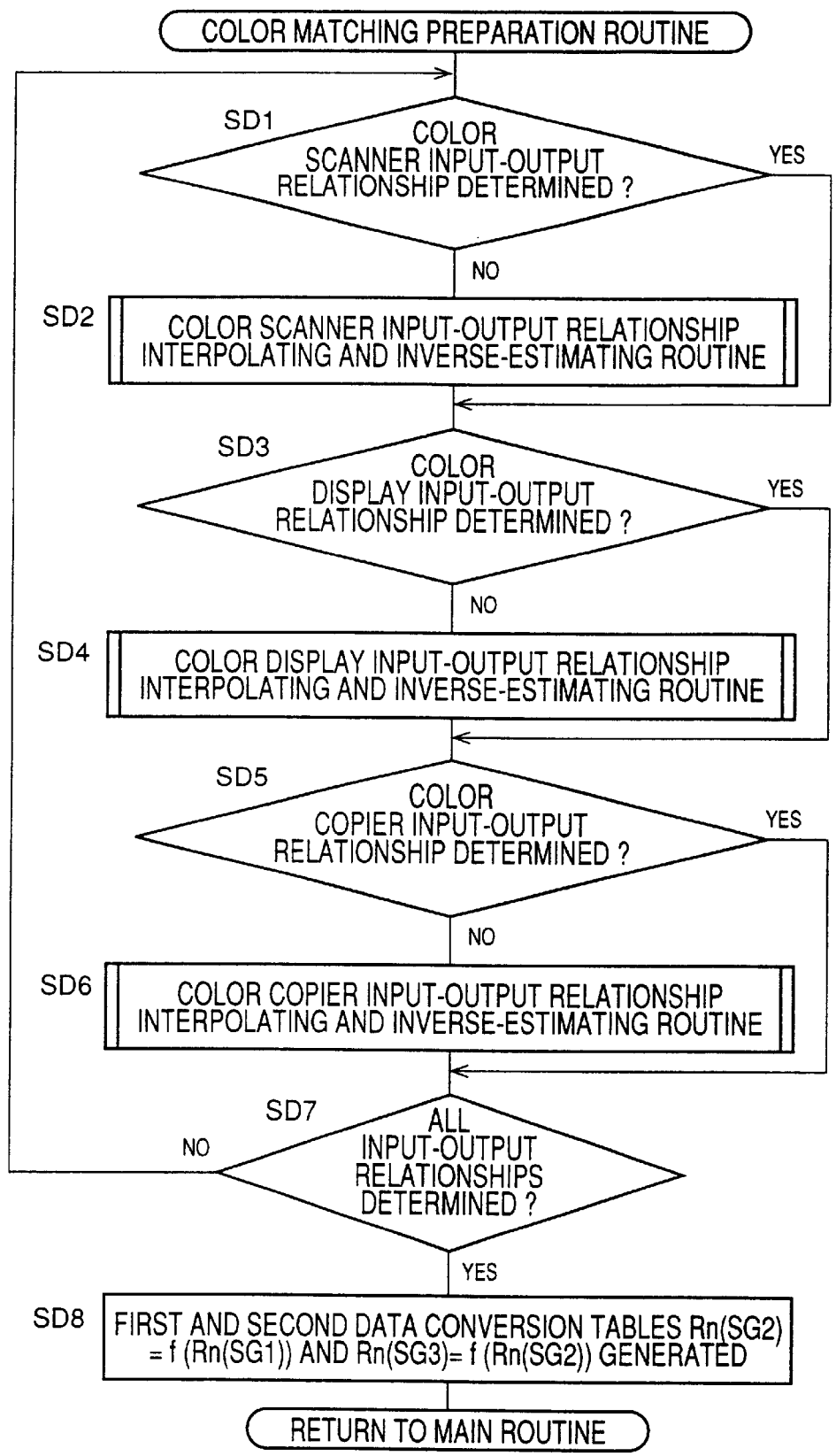
FIG. 9 is a flow chart illustrating a color matching preparation routine executed in step SM4 of the main routine of FIG. 6.

Referring next to FIGS. 6–12, there will be described the operations of the computer 18, which is adapted to execute a main routine illustrated in the flow chart of FIG. 6, which includes step SM2 for executing a color matching original generating routine illustrated in the flow chart of FIG. 7, and step SM4 for executing a color matching preparation routine illustrated in the flow chart of FIG. 9. The color matching original generating routine of FIG. 7 includes step SB2 for executing a color copier input-output relationship interpolating and inverse-estimating routine illustrated in the flow chart of FIG. 8. The color matching preparation routine of FIG. 9 includes step SD2 for executing a color scanner input-output relationship interpolating and inverse-estimating routine illustrated in the flow chart of FIG. 11, step SD4 for executing a color display input-output relationship interpolating and inverse-estimating routine illustrated in the flow chart of FIG. 12, and step SD6 for executing the color copier input-output relationship interpolating and inverse-estimating routine of FIG. 8.

The main routine of FIG. 6 is initiated with step SM1 for determining whether a COLOR MATCHING ORIGINAL GENERATING MODE is presently selected. This determination is effected based on a signal received from the keyboard 16. If an affirmative decision (YES) is obtained in step SM1, the control flow goes to step SM2 in which the color matching original generating routine of FIG. 7 is executed by the color matching original generating device 34.

The color matching original generating routine of FIG. 7 is initiated with step SB1 for determining whether the high-resolution input-output relationship $Rn=f_{copy}(Xn)$ of the color copier 20 has already been determined or obtained. If a negative decision (NO) is obtained in step SB1, the control flow goes to step SB2 in which the color copier input-output relationship interpolating and inverse-estimating routine illustrated in detail in FIG. 8 is executed by the color copier input-output relationship interpolating and inverse-estimating device 30.

The routine of FIG. 8 is initiated with step SC1 in which the color copier input-output relationship interpolating and inverse-estimating device 30 applies 125 input color data sets Rn (n=1, 2, 3, ... 125) to the color copier 20. The 125 input color data sets Rn are obtained by changing each of the three values R, G and B in five steps (m=0, 63, 127, 191 and 255), such that the five values m of each value R, G, B have a predetermined color difference interval between the value m=0 and the value m=255. As a result, the color copier 20 is operated to reproduce 125 colors on the recording medium 22, and the reproduced colors are measured by a color measuring device in the form of the spectrophotometer 32. The device 30 receives 125 output color data sets Xn (n=1, 2, 3, ... 125) from the spectrophotometer 32. Each output color data set Xn consists of the tristimulus values X, Y and Z in the CIE chromaticity coordinate system. Thus, a non-linear relationship between the 125 input color data sets Rn and the corresponding 125 output color data sets Xn is determined.

Step SC1 is followed by step SC2 in which a larger number of output color data sets Xn are obtained by interpolating the tristimulus values X, Y and Z of the 125 output color data sets Xn such that the thus obtained output color data sets have a predetermined color difference interval. This larger number (second number) is a sum of the number (first number) of the original 125 output color data sets Xn, and the number of output color data obtained by the interpolation, as indicated by "o" marks in FIG. 3. The second number may be the maximum number of input color data sets Rn that can be used by the color copier 20, or may be equal to the number of output data sets Xn large enough to assure a practically satisfactory high degree of density of the picture elements or color image resolution.

Described in detail, the 125 input color data sets Rn and the corresponding output color data sets Xn obtained by measurement are indicated by five free curves or approximating curves such as spline curves and Bezier curves corresponding to respective five different G values, in each of five two-dimensional R-X, R-Y and R-Z coordinate systems, which correspond to respective five different B values. The first number (125) of output color data sets Xn are interpolated to obtain the second number of output color data sets Xn. More specifically, a distance between two adjacent ones of the five X values which are defined by points of intersection of the five curves and the X axis in the R-X coordinate system is interpolated to obtain equally spaced-apart points of interpolation along the X axis, for each of the five B values. Similarly, a distance between two adjacent ones of the five Y values which are defined by points of intersection of the five curves and the Y axis in the R-Y coordinate system is interpolated to obtain equally spaced-apart points of interpolation along the Y axis, for each of the five B values. Further, a distance between two adjacent ones of the five Z values which are defined by points of intersection of the five curves and the Z axis in the R-Z coordinate system is interpolated to obtain equally spaced-apart points of interpolation along the Z axis, for each of the five B values.

Figure 10:
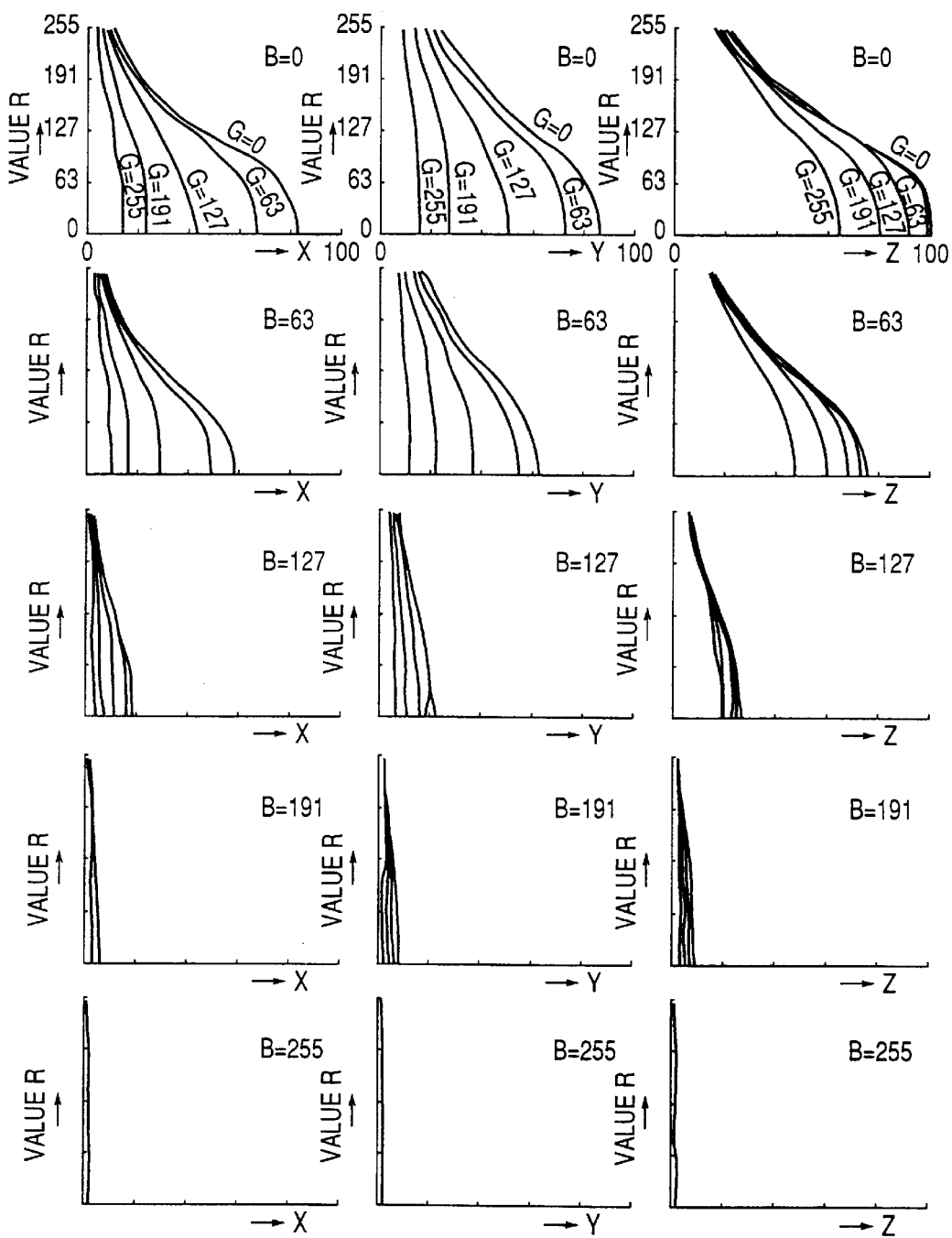
FIG. 10 is a view showing free curves representing relationships between X, Y, Z value and R value.

Then, the control flow goes to step SC3 in which the second number of input color data sets Rn corresponding to the second number of output color data sets Xn obtained in step SC2 are obtained by inverse estimation utilizing the approximating curves indicated above. Thus, the relationship between the second number of input color data sets Rn and the corresponding output color data sets Xn of the color copier 20 is obtained. In step SC2, the relationships represented by the approximating curves shown in FIG. 10 are used to obtain the second number of output color data sets Xn by interpolation as indicated by the "o" marks in FIG. 3. In step SC3, the second number of input color data sets Rn are obtained by inverse estimation based on the second number of output color data sets Xn, whereby the high-resolution input-output relationship $Xn=f_{copy}(Rn)$ of the color copier 20 is obtained in step SC3.

Once the high-resolution input-output relationship $Xn=f_{copy}(Rn)$ of the color copier 20 has been obtained, an affirmative decision (YES) is obtained in step SB1 of the color matching original generating routine of FIG. 7. In this case, the control flow goes to steps SB3 and SB4, which are executed by the color matching original generating device 34. In step SB3, the device 34 selects a predetermined first number of output color data sets Xn, for instance, 125 output color data sets Xn from among the second number of output color data sets Xn of the high-resolution input-output relationship $Xn=f_{copy}(Rn)$. The selected output color data sets Xn must have a predetermined constant color difference interval. Then, the device 34 determines the input color data sets Rn corresponding to the selected output color data sets Xn. In step SB4, the device 34 applies the determined input color data sets Rn to the color copier 20, so that a color image is reproduced on the recording medium 22, as the color matching original 36 which bears colors as represented by the output color data sets Xn.

Referring back to the main routine of FIG. 6, this main routine goes to step SM3 if a negative decision (NO) is obtained in step SM1. In step SM3, a determination as to whether a COLOR MATCHING PREPARATION mode is presently selected is effected based on a signal received from the keyboard 16. If an affirmative decision (YES) is obtained in step SM3, the control flow goes to step SM4 in which the color matching preparation routine of FIG. 9 is executed.

The color matching preparation routine of FIG. 9 is initiated with step SD1 to determine whether the input-output relationship $Rn=f_{imag}(Xn)$ has already been determined or obtained. If an affirmative decision (YES) is obtained in step SD1, the control flow goes to step SD3 while skipping step SD2. If a negative decision (NO) is obtained in step SD1, the control flow goes to step SD2 corresponding to the color scanner input-output relationship interpolating and inverse-estimating device 38 or step. That is, the color scanner input-output relationship interpolating and inverse-estimating routine of FIG. 11 is executed. Steps SE1–SE3 of the routine of FIG. 11 are similar to the steps SC1–SC3 of the color copier input-output relationship interpolating and inverse-estimating routine of FIG. 8.

The routine of FIG. 11 is initiated with step SE1 in which the color scanner input-output relationship interpolating and inverse-estimating device 38 determines 125 input color data sets Xn (n=1, 2, 3, . . . 125) which have been used by the color matching original generating device 34 in step SB3 or which have been measured by the spectrophotometer 40. The device 38 then activates the color scanner 10 to read the color matching original 36, and stores the output color data sets Rn which correspond to the 125 input color data sets Xn and which are generated by the color scanner 10. These output color data sets Rn constitute the image signal SG1. Thus, the non-linear relationship between the 125 input color data sets Xn and the corresponding output color data sets Rn is obtained in step SE1.

Step SE1 is followed by step SE2 similar to step SC2, in which a larger number of output color data sets Rn are obtained by interpolating the R, G and B values of the 125 output color data sets Rn such that the thus obtained output color data sets have a predetermined color difference interval. This larger number (second number) may be the maximum number of output color data sets Rn that can be outputted by the color scanner 10 and that can be used by the color display device 14 and the color copier 20, or may be equal to the number of output data sets Rn of the color scanner 10, which is large enough to assure a practically satisfactory high degree of density of the picture elements or color image resolution.

Then, the control flow goes to step SE3 in which the second number of output color data sets Rn corresponding to the second number of input color data sets Xn obtained in step SE2 are obtained by inverse estimation utilizing the approximating curves indicating the relationships between the 125 input color data sets Xn and the 125 output color data sets Rn. Thus, the relationship between the second number of output color data sets Rn and the corresponding input color data sets Xn of the color scanner 10 is obtained. In step SE2, the relationships represented by the approximating curves are used to obtain the second number of output color data sets Xn by interpolation as indicated by the "o" marks in FIG. 4. In step SE3, the second number of input color data sets Xn are obtained by inverse estimation based on the second number of output color data sets Rn, whereby the high-resolution input-output relationship $Rn=f_{imag}(Xn)$ of the color scanner 10 is obtained in step SE3.

Once the high-resolution input-output relationship $Rn=f_{imag}(Xn)$ of the color scanner 10 has been obtained, an affirmative decision (YES is obtained in step sD1 in the color matching preparation routine of FIG. 9, and the control flow goes to step SD3 to determine whether the high-resolution input-output relationship $Xn=f_{disp}(Rn)$ of the color display device 14 has already been determined. If an affirmative decision (YES) is obtained in step SD3, the control flow goes to step SD5 while skipping step SD4. If a negative decision (NO) is obtained in step SD3, the control flow goes to step SD4, which corresponds to the color display input-output relationship interpolating and inverse-estimating device 42 or step. In step SD4, the color display input-output relationship interpolating and intervese-estimating routine of FIG. 12 is executed. Steps SF1–SF3 of this routine of FIG. 12 are similar to steps SC1–SC3 of the routine of FIG. 8.

The routine of FIG. 12 is initiated with step SF1 in which the color display input-output relationship interpolating and inverse-estimating device 30 applies 125 input color data sets Rn (n=1, 2, 3, . . . 125) to the color display device 14. The 125 input color data sets Rn are obtained by changing each of the three values R, G and B in five steps (m=0, 61, 127, 191 and 255), such that the five values m of each value R, G, B have a predetermined color difference interval between the value m=0 and the value m=255. As a result, the color display device 14 is operated to reproduce 125 colors on its display screen, and the reproduced colors are measured by the spectrophotometer 44 (color measuring device). The device 42 receives 125 output color data sets Xn (n=1, 2, 3, . . . 125) from the spectrophotometer 44. Each output color data set Xn consists of the tristimulus values X, Y, Z in the CIE chromaticity coordinate system. Thus, a nonlinear relationship between the 125 input color data sets Rn and the corresponding 125 output color data sets Xn is determined.

Step SF1 is followed by step SF2 in which a larger number of output color data sets Xn are obtained by interpolating the tristimulus values X, Y and Y of the 125 output color data sets Xn such that the thus obtained output color data sets have a predetermined color difference interval, as in step SC2 of FIG. 8. This larger number (second number) is a sum of the number (first number) of the original 125 output color data sets Xn, and the number of output color data obtained by the interpolation, as indicated by "o" marks in FIG. 5. The second number may be the maximum number of input color data sets Rn that can be used by the color display device 14, or may be equal to the number of output color data sets Xn which is large enough to assure a paractically satisfactory high degree of density of the picture elements or color image resolution.

Then, the control flow goes to step SF3 in which the second number of input color data sets Rn corresponding to the second number of output color data sets Xn obtained in step SF2 are obtained by inverse estimation utilizing the approximating curves indicated above. Thus, the relationship between the second number of input color data sets Rn and the corresponding output color data sets Xn of the color copier 20 is obtained. In step SF2, the relationships represented by the approximating curves are used to obtain the second number of output color data sets Xn by interpolation as indicated by the "o" marks in FIG. 5. In step SF3, the second number of input color data sets Rn are obtained by inverse estimation based on the second number of output color data sets Xn, whereby the high-resolution input-output relationship $Xn=f_{disp}(Rn)$ of the color display device 14 is obtained in step SF3.

Once the high-resolution input-output relationship $Xn=f_{disp}(Rn)$ of the color display device 14 has been obtained, the control flow goes to step SD5 of FIG. 9 to determine whether the high-resolution input-output relationship $Xn=f_{copy}(Rn)$ has already been determined. If a negative decision (NO) is obtained in step SD5, the control flow goes to step SD6 corresponding to the color copier input-output relationship interpolating and inverse-estimating device 30 and step, so that the routine of FIG. 8 is executed as in step SB2 of the routine of FIG. 7, to obtain the high-resolution input-output relationship $Xn=f_{copy}(Rn)$ of the color copier 20. If an affirmative decision (YES) is obtained in step SD5, the control flow goes to step SD7 while skipping step SD6.

Step SD7 is implemented to determine whether all of the three high-resolution relationships $Xn=f_{copy}(Rn)$, $Rn=f_{imag}(Xn)$ and $Xn=f_{disp}(Rn)$ have been obtained. If a negative decision (NO) is obtained in step SD7, the control flow goes back to step SD1. If an affirmative decision (YES) is obtained in step SD7, the control flow goes to step SD8 corresponding to the first color data correlation generating device 46 and the second color data correlation generating device 50. In step SD8, the first color data correlation generating device 46 generates the first color data correlationship Rn(SG2)=f(Rn(SG1)) for converting the image signal SG1 consisting of the output color data sets Rn(SG1) received from the color scanner 10, into the image data SG2 consisting of input color data sets Rn(SG2) to be supplied to the color display device 14. This first color data correlationship Rn(SG2)=f(Rn(SG1)) is generated according to the high-resolution input-output relationship $Rn=f_{imag}(Xn)$ obtained by the color scanner input-output relationship interpolating and inverse-estimating device 38 in step SD2, and the high-resolution input-output relationship $Xn=f_{disp}(Rn)$ obtained by the color display input-output relationship interpolating and inverse-estimating device 42 in step SD4. In step SD8, the second color data correlation generating device 50 generates the second color data correlationship Rn(SG3)=f(Rn(SG2)) for converting the image signal SG2 consisting of the input color data sets Rn(SG2) received from the first data converting device 48, into the image data SG3 consisting of input color data sets Rn(SG3) to be supplied to the color copier 20. The device 50 generates the second color data correlationship Rn(SG3)=f(Rn(SG2)), according to the above-indicated high-resolution input-output relationship $Xn=f_{disp}(Rn)$ and the high-resolution input-output relationship $Xn=f_{copy}(Rn)$ obtained by the color copier input-output relationship interpolating and inverse-estimating device 30 in step SD6. These first and second color data correlationships Rn(SG2)=f(Rn(SG1)) and Rn(SG3)=f(Rn(SG2)) are stored in the computer 18.

Referring back to the main routine of FIG. 6, the control flow goes to step SM5 if the negative decision (NO) is obtained in both of steps SM1 and SM3. Step SM5 is provided to determine whether the image signal SG1 is present. If a negative decision (NO) is obtained in step SM5, the control flow goes to step SM7 while skipping step SM6 which corresponds to the first data converting device 48. If an affirmative decision (YES) is obtained in step SM5, the control flow goes to step SM6 in which the image signal SG1 is converted into the image signal SG2, according to the first color data correlationship Rn(SG2)=f(Rn(SG1)) obtained in step SD8. Thus, each time the image signal SG1 is received by the first data converting device 48, the output color data sets Rn(SG1) generated by the color scanner 10 are converted into the input color data sets Rn(SG2) to be applied to the color display device 14, according to the first color data correlationship Rn(SG2)=f(Rn(SG1).

Step SM7 following step SM6 is provided to determine whether the image signal SG2 is present. If a negative decision (NO) is obtained in step SM7, one cycle of execution of the main routine of FIG. 6 is terminated, without implementing step SM8 which corresponds to the second data converting device 52. If an affirmative decision (YES) is obtained in step SM7, the control flow goes to step SM8 in which the image data SG2 is converted into the image signal SG3 according to the second color data correlationship Rn(SG3)=f(Rn(SG2)) obtained in step SD8. Thus, each time the image signal SG2 is received by the second data converting device 52, the input color data sets Rn(SG2) generated by the first data converting device 48 are converted into the input color data sets Rn(SG3) to be applied to the color copier 20 according to the second color data correlationship Rn(SG3)=f(Rn(SG2)).

According to the present embodiment of this invention, the colors of the color image reproduced on the screen of the color display device 14 according to the image signal SG2 are matched with the colors of the color image on the original 12, which color image has been read by the color scanner 10. Further, the colors of the color image reproduced on the recording medium 22 by the color copier 20 according to the image signal SG3 are matched with the colors of the color image on the original 12 read by the color scanner 10, and with the colors of the color image reproduced on the color display device 14 according to the image signal SG2. An experimentation conducted by the present inventor revealed that the present color matching method makes it possible to achieve accurate color matching with a maximum color difference $\Delta E^*_{ab}$ as small as about 2, contrary to the conventional color matching with a maximum color difference $\Delta E^*_{ab}$ as large as about 20.

The color matching method in the present embodiment described above includes the color scanner input-output relationship interpolating and inverse-estimating step (SD2) wherein the predetermined first number of (e.g., 125) input color data sets (external color data) Xn having a predetermined color difference interval are determined, and the original color image having colors as represented by those input color data sets Xn is read by the color scanner 10 (color image input device), so that the predetermined number of output color data sets (internal color data) Rn generated by the color scanner 10 are obtained in relation to the input color data sets Xn. Then, the predetermined second number of output color data sets Rn are obtained by interpolating the first number of output color data sets Rn, and the predetermined second number of input color data sets Xn corresponding to the predetermined second number of output color data sets Rn are obtained by inverse estimation. Thus, the high-resolution input-output relationship $Rn=f_{imag}(Xn)$ between the second number of the output color data sets Rn and the second number of the input color data sets Xn is obtained.

The present method further includes the color display input-output relationship interpolating and inverse-estimating step (SD4) wherein the predetermined first number of (e.g., 125) input color data sets (internal color data) Rn having a predetermined color difference interval are determined, and these determined input color data sets Rn are applied to the color display device 14 (color image output device), so that the predetermined number of output color data sets (external color data) Xn representing the colors reproduced on the color display device 14 are obtained in relation to the input color data sets Rn. Then, the predetermined second number of output color data sets Xn are obtained by interpolating the first number of output color data sets Xn, and the predetermined second number of input color data sets Rn corresponding to the predetermined second number of output color data sets Xn are obtained by inverse estimation. Thus, the high-resolution input-output relationship $Xn=f_{disp}(Rn)$ between the second number of the output color data sets Xn and the second number of the input color data sets Rn.

The present method includes the color data correlation generating step (SD8) wherein the color data correlationship or color data converting table $Rn(SG2)=f(Rn(SG1))$ for converting the image signal SG1 consisting of the output color data sets Rn(SG1) generated by the color scanner 10 into the image signal SG2 consisting of the input color data sets Rn(SG2) to be applied to the color display device 14 is obtained according to the above-indicated two high-resolution input-output relationships $Rn=f_{imag}(Xn)$ and $Xn=f_{disp}(Rn)$.

In the color matching arrangement according to the present embodiment described above, the colors of the original color image as read by the color scanner 10 can be suitably matched with the colors of the color image as reproduced on the screen of the color display device 14 according to the input color data sets Rn(SG2) which are obtained by conversion from the output color data sets Rn(SG1) generated by the color scanner 10.

The conversion of the output color data sets Rn(SG1) generated by the color scanner 10 into the input color data sets Rn(SG2) to be supplied to the color display device 14 is effected in the data converting step (SM6) according to the data conversion table or correlationship $Rn(SG2)=f(Rn(SG1))$ obtained in the color data correlation generating step (SD8) described above. This conversion makes it possible to suitably match the colors as reproduced on the screen of the color display device 14 with the colors on the original 12 as read by the color scanner 10.

The color matching method in the present embodiment described above further includes the color display input-output relationship interpolating and inverse-estimating step (SD4) wherein the predetermined first number of (e.g., 125) input color data sets (internal color data) Rn having a predetermined color difference interval are determined, and the thus determined input color data sets Rn are applied to the color display device 14, to obtain the corresponding output color data sets (external color data) Xn representing the colors as displayed on the color display device 14. Then, the predetermined second number of output color data sets Xn are obtained by interpolating the first number of output color data sets Xn, and the predetermined second number of input color data sets Rn corresponding to the predetermined second number of output color data sets Xn are obtained by inverse estimation. Thus, the high-resolution input-output relationship $Xn=f_{disp}(Rn)$ between the second number of the output color data sets Xn and the second number of the input color data sets Rn.

The present method further includes the color copier input-output relationship interpolating and inverse-estimating step (SD6) wherein the predetermined first number of (e.g., 125) input color data sets (internal color data) Rn having a predetermined color difference interval are determined, and these determined input color data sets Rn are applied to the color copier 20 (color image output device), so that the predetermined number of output color data sets (external color data) Xn representing the colors reproduced by the color copier 20 are obtained in relation to the input color data sets Rn. Then, the predetermined second number of output color data sets Xn are obtained by interpolating the first number of output color data sets Xn, and the predetermined second number of input color data sets Rn corresponding to the predetermined second number of output color data sets Xn are obtained by inverse estimation. Thus, the high-resolution input-output relationship $Xn=f_{copy}(Rn)$ between the second number of the output color data sets Xn and the second number of the input color data sets Rn.

The present method further includes the color data correlation generating step (SD8) wherein the color data correlationship or color data converting table $Rn(SG3)=f(Rn(SG2))$ for converting the image signal SG2 consisting of the output color data sets Rn(SG2) to be applied to the color display device 14 into the image signal SG3 consisting of the input color data sets Rn(SG3) to be applied to the color copier 20 is obtained according to the above-indicated two high-resolution input-output relationships $Xn=f_{disp}(Rn)$ and $Xn=f_{copy}(Rn)$.

In the color matching arrangement according to the present embodiment described above, the colors of the color image as reproduced on the screen of the color display device 14 can be suitably matched with the colors of the color image as reproduced by the color copier 20 according to the input color data sets Rn(SG3) which are obtained by conversion from the output color data sets Rn(SG2) which are used for the color display device 14.

The conversion of the input color data sets Rn(SG2) to be applied to the color display device 14 into the input color data sets Rn(SG3) to be supplied to the color copier 20 is effected in the data converting step (SM8) according to the data conversion table or correlationship Rn(SG3)=f(Rn(SG2)) obtained in the color data correlation generating step (SD8) described above. This conversion makes it possible to suitably match the colors as reproduced on the screen of the color display device 14 with the colors as reproduced on the recording medium 22 by the color copier 20.

It will be understood that the color matching method according to the present embodiment of this invention comprises: a first interpolating and inverse-estimating step (SD2, SD4) of (a) applying to a first image processing device (color scanner 10 or color display device 14), as a first number of input color data sets, one of a first batch of external color data (Xn) and a first batch of internal color data (Rn) of the first image processing device, to obtain a relationship between the first number of input color data sets and a first number of output color data sets which correspond to the first number of the input color data sets and which constitute the other of the first batch of external color data and the first batch of internal color data, (b) generating a second number of output color data sets by interpolation of the first number of output color data sets, the second number being larger than the first number, and (c) effecting an inverse estimation to obtain a second number of input color data sets corresponding to the generated second number of output color data sets, to obtain a first high-resolution input-output relationship [Rn=$f_{imag}$(Xn) or Xn=$f_{disp}$(Rn)] between the second number of input color data sets and the second number of output color data sets which constitute one and the other of a second batch of external color data and a second batch of internal color data; a second interpolating and inverse-estimating step (SD4, SD6) of (a) applying to a second image processing device (color display device 14 or color copier 20) connected to the first image processing device, as a first number of input color data sets of the second image processing device, one of a first batch of external color data (Xn) and a first batch of internal color data (Rn) of the second image processing device, to obtain a relationship between the first number of input color data sets of the second image processing device and a first number of output color data sets which correspond to the first number of the input color data of the second image processing device and which constitute the other of the first batch of external color data and the first batch of internal color data of the second image processing device, (b) generating a second number of output color data sets of the second image processing device, by interpolation of the first number of output color data sets of the second image processing device, the second number of the output color data sets of the second image processing device being larger than the first number of output color data sets of the second image processing device, and (c) effecting an inverse estimation to obtain a second number of input color data sets corresponding to the second number of output color data sets of the second image processing device, to obtain a second high-resolution input-output relationship [Xn=$f_{disp}$(Rn) or Xn=$f_{copy}$(Rn)] between the second number of input color data sets and the second number of output color data sets of the second image processing device which constitute one and the other of a second batch of external color data and a second batch of internal color data of the second image processing device; and a color data correlation generating step (SD8) of generating a color data correlationship [Rn(SG2)=f(Rn(SG1)) or Rn(SG3)=f(Rn(SG2))] for converting the first batch of internal color data (Rn) of the first image processing device into the second batch of internal color data (Rn) of the second image processing device, according to the above-indicated first and second high-resolution input-output relationships. Accordingly, the external color data of the first image processing device and the external color data of the second image processing device can be made consistent or matched with each other. For the color display device 14 and the color copier 20, the external color data (Xn) represent the colors of color images as reproduced by those color image output devices 14, 20. For the color scanner 10, the external color data (Xn) represent the colors of a color image on the original 12 as read by the color scanner 10 as the color image input device 10.

While the present preferred embodiment of this invention has been described above in detail by reference to the accompanying drawings, it is to be understood that the present invention may be otherwise embodied.

In the illustrated embodiment, the high-resolution relationship Rn=$f_{imag}$(Xn) between the output color data sets Rn and the input color data sets Xn of the color scanner 10 is obtained in the color scanner input-output relationship interpolating and inverse-estimating step SD2, and the high-resolution relationship Xn=$f_{disp}$(Rn) between the output color data sets Xn and the input color data sets Rn of the color display device 14 is obtained in the color display input-output relationship interpolating and inverse-estimating step SD4, while the high-resolution input-output relationship Xn=$f_{copy}$(Rn) of the color copier 20 is obtained in the color copier input-output relationship interpolating and inverse-estimating step SD6. Although the output color data sets Rn, Xn of those high-resolution relationships obtained by interpolation and inverse estimation have the predetermined constant color difference interval, the output color data sets Rn, Xn obtained by interpolation in steps SE2, SF2 and SC2 need not have a completely constant color difference interval. In other words, the color difference between the adjacent output color data sets may more or less differ from the color difference between the other adjacent output color data sets, provided the color difference interval is almost constant, permitting a satisfactory degree of accuracy of the color matching between the input color data sets Xn of the color scanner 10 and the output color data sets Xn of the color display device 14 or color copier 20, and between the output color data sets Xn of the color display device 14 and the color copier 20.

While the color image input and output apparatus according to the illustrated embodiment includes the color scanner 10, color display device 14 and color copier 20, one of these three color input and output devices may be eliminated. Further, the color copier 20 may be replaced by a second color display device, or the color display device 14 may be replaced by a second color copier. Alternatively, the color scanner 10 may be replaced by any other type of color image input device such as a video camera and a digital camera. Further, one or both of the color display device 14 and the color copier 20 may be replaced by any other types of color image output device such as a color liquid crystal display, a sublimation type printer, a color laser printer and a silver salt type printer.

Although the computer 18 is a stand-alone unit separate from the color scanner 10, color display device 14 and color copier 20, the computer 18 may be built in one of color scanner 10, color display device 14 and color copier 20.

The color image input and output apparatus according to the illustrated embodiment includes the color scanner input-output relationship interpolating and inverse-estimating device 38, color display input-output relationship interpolating and inverse-estimating device 42, color copier input-output relationship interpolating and inverse-estimating device 30, first color data correlation generating device 46 and second color data correlation generating device 50, for effecting color matching among the color scanner 10, color display device 14 and color copier 20. However, it is possible to provide a color matching apparatus (computer) including those devices, so that the color matching apparatus generates the color data correlationship Rn(SG2)=f(Rn(SG1)) or Rn(SG3)=f(Rn(SG2)) and store the generated color data correlationship in suitable memory means provided in the appropriate color image input and output devices to be shipped, so that color data converting means provided in each of those color input and output devices effects necessary color data conversion according to the stored color data correlationship Rn(SG2)=f(Rn(SG1)) or Rn(SG3)=f(Rn(SG2)).

While the color matching original 36 is generated by the color copier 20 in the illustrated embodiment, the color matching original may be generated by any other type of color copying device.

Although the measuring devices in the form of spectrophotometers 32, 40, 44 are used in the respective color copier input-output relationship interpolating and inverse-estimating step SD6, color scanner input-output relationship interpolating and inverse-estimating step SD2 and color display input-output interpolating and inverse-estimating step SD4, a single measuring device may be used in those steps.

It is to be understood that the present invention may be embodied with various other changes, modifications and improvements, which may occur to those skilled in the art, in the light of the foregoing teachings.

What is claimed is:

1. A method of effecting color matching between external color data of a first image processing device and external color data of a second image processing device connected to said first image processing device, said external color data representing a color image as viewed by an observer and being distinguished from internal color data which represent a color image to be reproduced, said method comprising:

a first interpolating and inverse-estimating step of (a) applying to said first image processing device, as a first number of input color data sets, one of a first batch of measured external color data and a first batch of internal color data of said first image processing device, for operating said first image processing device, to obtain a relationship between said first number of input color data sets and a first number of output color data sets which correspond to said first number of said input color data sets and which constitute the other of said first batch of measured external color data and said first batch of internal color data, (b) generating a second number of output color data sets by interpolation of said first number of output color data sets, such that said second number of output color data sets have a substantially constant color difference interval, said second number being larger than said first number, and (c) effecting an inverse estimation to obtain a second number of input color data sets corresponding to said second number of output color data sets, to obtain a first high-resolution input-output relationship between said second number of input color data sets and said second number of output color data sets which respectively constitute one and the other of a second batch of measured external color data and a second batch of internal color data;

a second interpolating and inverse-estimating step of (a) applying to said second image processing device, as a first number of input color data sets of said second image processing device, one of a first batch of measured external color data and a first batch of internal color data of said second image processing device, for operating said second image processing device, to obtain a relationship between said first number of input color data sets of said second image processing device and a first number of output color data sets which correspond to said first number of said input color data sets of said second image processing device and which constitute the other of said first batch to external color data and said first batch of internal color data of said second image processing device, (b) generating a second number of output color data sets of said second image processing device, by interpolation of said first number of output color data sets of said second image processing device, such that said second number of output color data sets of said second image processing device have a substantially constant color difference interval, said second number of said output color data sets of said second image processing device being larger than said first number of output color data sets of said second image processing device, and (c) effecting an inverse estimation to obtain a second number of input color data sets corresponding to said second number of output color data sets of said second image processing device, to obtain a second high-resolution input-output relationship between said second number of input color data sets and said second number of output color data sets of said second image processing device which respectively constitute one and the other of a second batch of measured external color data and a second batch of internal color data of said second image processing device;

a color data correlation generating step of generating, according to said first and second high-resolution input-output relationships, a color data correlationship for converting said first batch of internal color data of said first image processing device into said second batch of internal color data of said second image processing device; and a data converting step for converting said first batch of internal color data of said first image processing device directly into said second batch of internal color data of said second image processing device, according to said color data correlationship generated in said color data correlation generating step, such that colors represented by said second batch of measured external color data of said second image processing device match colors represented by said second batch of measured external color data of said first image processing device.

2. The method according to claim 1, wherein said first image processing device consists of a color image input device, while said second image processing device consists of a color output device, and wherein said first interpolating and inverse-estimating step comprises a step of obtaining a relationship between said first number of input color data sets representative of colors of an original image and said first number of output color data sets generated from said color image input device upon application of said first number of input color data sets thereto, a step of generating said second number of output color data sets by interpolation of said first number of output color data sets, such that said second number of output color data sets have said substantially constant color difference interval, and a step of effecting the inverse estimation to obtain said second number of input color data sets corresponding to said second number of output color data sets, to obtain said first high-resolution input-output relationship of said color image input device, said second interpolating and inverse-estimating step comprises a step of obtaining a relationship between said first number of input color data sets of said color image output device and said first number of output color data sets generated from said color image output device upon application of said first number of input color data sets thereto, a step of generating said second number of output color data sets by interpolation of said first number of output color data sets of said color image output device, such that said second number of output color data sets of said image output device have said substantially constant color difference interval, and a step of effecting the inverse estimation to obtain said second number of input color data sets corresponding to said second number of output color data sets of said color output device, to obtain said second high-resolution input-output relationship of said color image output device, and said color data correlationship generating step comprises a step of generating a color data converting table for converting said second number of said output color data sets of said color image input device into said second number of said input color data sets of said color image output device, according to said first and second high-resolution input-output relationships.

3. The method according to claim 2, further comprising a data converting step for converting said second number of said output color data sets of said color image input device into said second number of said input color data sets of said color image output device according to said color data converting table.

4. The method according to claim 1, wherein said first image processing device consists of a first color image output device, while said second image processing device consists of a second color image output device, and wherein said first interpolating and inverse-estimating step comprises a step of obtaining a relationship between said first number of input color data sets of said first color image output device and said first number of output color data sets generated from said first color image output device upon application of said first number of input color data sets thereto, a step of generating said second number of output color data sets by interpolation of said first number of output color data sets, such that said second number of output color data sets have said substantially constant color difference interval, and a step of effecting the inverse estimation to obtain said second number of input color data sets corresponding to said second number of output color data sets, to obtain said first high-resolution input-output relationship of said first color image output device, said second interpolating and inverse-estimating step comprises a step of obtaining a relationship between said first number of input color data sets of said second color image output device and said first number of output color data sets generated from said second color image output device upon application of said first number of input color data sets thereto, a step of generating said second number of output color data sets by interpolation of said first number of output color data sets of said color image output device, such that said second number of output color data sets of said image output device have said substantially constant color difference interval, and a step of effecting the inverse estimation to obtain said second number of input color data sets corresponding to said second number of output color data sets of said color output device, to obtain said second high-resolution input-output relationship of said second color image output device, and said color data correlationship generating step comprises a step of generating a color data converting table for converting said second number of said input color data sets of said first color image output device into said second number of said input color data sets of said second color image output device, according to said first and second high-resolution input-output relationships.

5. The method according to claim 4, further comprising a data converting step for converting said second number of said input color data sets of said first color image output device into said second number of said input color data sets of said second color image output device according to said color data converting table.

6. The method according to claim 1, wherein said first number of output color data sets which correspond to said first number of said input color data sets are measured when said first image processing device is operated according to said one of said first batch of measured external color data and said first batch of internal color data applied thereto.

7. The method according to claim 1, wherein said first number of output color data sets which correspond to said first number of said input color data of said second image processing device are measured when said second image processing device is operated according to said one of a first batch of measured external color data and a first batch of internal color data of said second image processing device applied thereto.

8. The method according to claim 1, wherein said first number of output color data sets which correspond to said first number of said input color data sets are read and stored when said first image processing device is operated according to said one of said first batch of measured external color data and said first batch of internal color data applied thereto.

9. The method according to claim 1, wherein said first number of output color data sets which correspond to said first number of said input color data of said second image processing device are read and stored when said second image processing device is operated according to said one of a first batch of measured external color data and a first batch of internal color data of said second image processing device applied thereto.

* * * * *